US012796723B2

(12) United States Patent
Zhang

(10) Patent No.: US 12,796,723 B2
(45) Date of Patent: Nov. 17, 2026

(54) PREPARATION METHOD FOR DIET-REDUCING CAPSULE CONTAINING MULTI-NUTRIENT MICROSPHERES AND RESULTING PRODUCT

(71) Applicant: Shandong Rientech Medical Technology Co., Ltd, Shandong (CN)

(72) Inventor: Haijun Zhang, Shandong (CN)

(73) Assignee: Shandong Rientech Medical Technology Co., Ltd, Shandong (CN)

( * ) Notice: Subject to any disclaimer, the term of this patent is extended or adjusted under 35 U.S.C. 154(b) by 354 days.

(21) Appl. No.: 18/419,521

(22) Filed: Jan. 22, 2024

(65) Prior Publication Data

US 2024/0268439 A1 Aug. 15, 2024

(30) Foreign Application Priority Data

Jan. 30, 2023 (CN) ........................ 202310044315.5

(51) Int. Cl.

| | |
|---|---|
| ***A23P 20/10*** | (2016.01) |
| ***A23L 33/135*** | (2016.01) |
| ***A23L 33/15*** | (2016.01) |
| ***A23L 33/16*** | (2016.01) |
| ***A23P 10/30*** | (2016.01) |

(52) U.S. Cl.

CPC ........... *A23P 20/105* (2016.08); *A23L 33/135* (2016.08); *A23L 33/15* (2016.08); *A23L 33/16* (2016.08); *A23P 10/30* (2016.08)

(58) Field of Classification Search

None

See application file for complete search history.

(56) References Cited

U.S. PATENT DOCUMENTS

| | | | |
|---|---|---|---|
| 2013/0089737 | A1 | 4/2013 | Sannino et al. |
| 2014/0010918 | A1 | 1/2014 | Quintens et al. |
| 2016/0263153 | A1 | 9/2016 | O'Hara |

FOREIGN PATENT DOCUMENTS

| | | |
|---|---|---|
| CN | 102905762 | 2/2017 |
| CN | 113975335 | 4/2022 |
| CN | 115317630 | 11/2022 |

OTHER PUBLICATIONS

"Office Action of China Counterpart Application", issued on Apr. 10, 2023, p. 1-p. 6.

*Primary Examiner* — Nicole P Babson

(74) *Attorney, Agent, or Firm* — JCIPRNET

(57) ABSTRACT

A preparation method for a diet-reducing capsule containing multi-nutrient microspheres and a resulting product, relating to the field of food biotechnology, are provided. The diet-reducing capsule includes a porous capsule shell, multi-nutrient microspheres and a matrix gel containing the multi-nutrient microspheres. The porous capsule shell is prepared by using a laser punching technology. The multi-nutrient microsphere is a miniature container which is formed by taking probiotics as a core material and taking a freeze-drying protective agent, a natural polymer material embedded with vitamins, minerals and prebiotics and an enteric coating material as a wall material. The matrix gel for the microspheres is biomimetic cellulose superabsorbent gel.

7 Claims, 10 Drawing Sheets

PREPARATION METHOD FOR DIET-REDUCING CAPSULE CONTAINING MULTI-NUTRIENT MICROSPHERES AND RESULTING PRODUCT

CROSS-REFERENCE TO RELATED APPLICATION

This application claims the priority benefit of China application serial no. 202310044315.5, filed on Jan. 30, 2023. The entirety of the above-mentioned patent application is hereby incorporated by reference herein and made a part of this specification.

BACKGROUND

Technical Field

The present disclosure relates to a preparation method for a diet-reducing capsule containing multi-nutrient microspheres, and a resulting product, belonging to the field of food biotechnology.

Description of Related Art

Vitamins, minerals and probiotics play different and important roles in the metabolism, growth, development and maintenance of physical health of the human body, so daily supplementation of these substances is crucial. However, some vitamins and probiotics will lose their activity in the environments of gastric acid and bile salts due to their special properties. In addition, according to national regulations, nutritional supplement products can play a role in health care in need of reaching an amount required by the human body within their shelf life, so vitamins and probiotics need to be protected.

Moreover, due to the improvement of living standards of people in China, some of them have unbalanced and unreasonable living and dietary habits, resulting in increasingly serious obesity problems, so diseases that seriously endanger human health, such as hypertension, type II diabetes, cardiovascular and cerebrovascular diseases, and some cancers have followed. Therefore, weight control is key means to prevent and delay the onset and progression of these diseases.

At present, a number of regimens have been developed for weight management, often including a lifestyle intervention method, a drug intervention method, and a surgical intervention method. However, the lifestyle intervention method is easy to give up halfway, and the drug intervention method and surgical intervention method have great side effects, which violate the principle of health. Fundamentally, weight loss occurs when consumption is higher than intake, but increasing consumption requires a lot of exercise, which is difficult for stressed people who do not like sports, so it is especially important to invent a healthy way to lose weight with the goals of reducing intake and controlling diet.

Some measures have been taken to address the problem of controlling diet to lose weight. The patent CN113975335 B uses a green coffee bean extract, a *Hibiscus sabdariffa* extract, a *Crocus sativus* L. extract and a L-carnitine as raw materials to prepare a composition that controls appetite and induces satiety, and induces an increase in human glucagon-like peptide-1 (GLP-1) secretion through the regulation of the feeding center of the brain-gut axis, thereby affecting the satiety center and achieving the purpose of weight loss. However, in this method, the increase in GLP-1 may cause side effects such as palpitations in obese patients, and may also cause excessive stress on GLP-1-secreting organs, resulting in premature aging or other potential risks. The patent CN102905762 B provides a methylcellulose gel mass that can provide satiety, but cannot meet daily nutritional needs of the human body because of the lack of vitamins and minerals, and can also cause physiological dysfunction due to the long-term lack of vitamins and minerals, so the loss outweighs the gain. Meanwhile, the intestinal flora of obese patients may be different from that of normal people, which may also be the cause of obesity. It is worth noting that weight loss is a long-term process, and if there are no hints of words such as “vitamins”, “minerals” and “health”, it may lead to obese people only caring about weight and ignoring health, which is not conducive to the development of good dietary habits. Therefore, the present disclosure aims to develop a diet-reducing capsule that supplements a variety of nutrients at the same time.

SUMMARY

An object of the present disclosure is to provide a preparation method for a die-reducing capsule (i.e., food intake reducing and dieting capsule) that can disintegrate rapidly and simultaneously achieve healthy weight loss, nutritional supplementation, intestinal conditioning and increased colonization rate of probiotics, and the diet-reducing capsule prepared according to this method.

A specific technical solution of the present disclosure is as follows.

A preparation method for a diet-reducing capsule containing multi-nutrient microspheres includes the following steps:

(1) adding sodium carboxymethyl cellulose to an aqueous solution containing a polybasic carboxylic acid, stirring evenly and drying in a drying oven, then performing cross-linking at high temperature, crushing and sieving, and washing and filtering with distilled water to prepare wet hydrogel particles;

(2) inoculating probiotics in a sterile medium according to a fixed inoculation amount, repeatedly activating the probiotics for 5 generations under the same culture conditions, collecting bacterial sludge by low-temperature centrifugation, washing the bacterial sludge with sterile normal saline, then mixing evenly with an aqueous solution of a freeze-drying protective agent to obtain a bacterial suspension, then adding an aqueous solution of a natural polymer material to the bacterial suspension and mixing evenly again, then solidifying the obtained mixed solution, and washing and filtering to obtain solidified probiotics, followed by low-temperature storage for later use;

(3) mixing powders of vitamins, minerals and prebiotics evenly, sieving with a 70-mesh sieve to obtain a vitamin-mineral-prebiotics composite powder, and then mixing the vitamin-mineral-prebiotics composite powder evenly with the aqueous solution of the natural polymer material to obtain a vitamin-mineral-prebiotics-natural polymer material mixed solution;

(4) mixing the solidified probiotics evenly with the vitamin-mineral-prebiotics-natural polymer material mixed solution to obtain a mixed nutrient solution, then mixing the mixed nutrient solution with an aqueous solution of an enteric coating material, and washing and filtering to obtain wet probiotics-prebiotics-vitamin-mineral microspheres;

(5) mixing the wet probiotics-prebiotics-vitamin-mineral microspheres evenly with the wet hydrogel particles to obtain a mixture, pre-cooling and then freeze-drying the mixture to obtain a freeze-dried product, and then crushing and sieving the freeze-dried product to obtain a capsule content; and (6) fixing an empty capsule shell and punching holes in the empty capsule shell with laser to obtain a porous capsule shell, and then combining the porous capsule shell with the capsule content to obtain the diet-reducing capsule containing multi-nutrient microspheres.

Further, in step (1), the sodium carboxymethyl cellulose and the polybasic carboxylic acid are cross-linked to form a three-dimensional network structure, wherein the sodium carboxymethyl cellulose has a viscosity of 7000 to 15000.

Further, in step (1), the polybasic carboxylic acid is one of citric acid, aconitic acid, oxalic acid, tartaric acid, malic acid, acetic acid, malonic acid, succinic acid, adipic acid, azelaic acid, terephthalic acid, trimellitic acid, trimesic acid, ethylenediaminetetraacetic acid and 2-methylglutaric acid, preferably citric acid.

Further, in step (1), a viscosity of the sodium carboxymethyl cellulose is 7000 to 15000; a mass ratio of the sodium carboxymethyl cellulose to the polybasic carboxylic acid is (310 to 350): 1, and a mass ratio of the sodium carboxymethyl cellulose to water is 1:(10 to 22).

Further, in step (1), a way of stirring is performed first for 80 to 100 min at a rotation speed of 50 to 70 rpm, and then for 14 to 20 h at a rotation speed of 20 to 40 rpm; and a drying way of the drying oven is to adjust the temperature of the drying oven to 40 to 60 °C, with drying first for 20 to 28 h, turning over and then continuing to dry for 28 to 36 h.

Further, in step (1), high-temperature cross-linking is to treat the dried gel at high temperature, wherein a temperature of high-temperature cross-linking is 110 to 130° °C, and the high-temperature cross-linking time is 3.6 to 4.4 h.

Further, in step (1), a way of crushing and sieving is to crush the cross-linked product with a crusher, and then sieve with an 18-mesh sieve and a 26-mesh sieve; and a way of washing with the distilled water is to wash the solid hydrogel particles with the distilled water for 2 to 6 times, 2 to 4 h each time, wherein a mass ratio of the solid hydrogel particles to the distilled water is 1:(100 to 200) in each washing.

Further, in step (2), the probiotics is a mixed strain selected from two or more of *Lactobacillus plantarum, Lactobacillus rhamnosus, Lactobacillus fermentum, Lactobacillus salivarius, Lactobacillus helveticus, Lactobacillus gasseri, Lactobacillus johnsonii, Lactobacillus crispatus, Lactobacillus delbrueckii* subsp. *bulgaricus, Lactobacillus acidophilus, Lactobacillus casei* subsp. *Casei, Lactobacillus paracasei, Lactobacillus reuteri, Bifidobacterium lactis, Bifidobacterium bifidum, Bifidobacterium infantis, Bifidobacterium longum, Bifidobacterium breve, Bifidobacterium adolescent, Bifidobacterium animalis* and *Streptococcus thermophilus*, preferably *Bifidobacterium longum* and *Lactobacillus acidophilus.*

Further, in step (2), the natural polymer material is one or more of sodium alginate, chitosan, modified starch, carboxymethyl cellulose, methyl cellulose, ethyl cellulose, hydroxypropyl cellulose, gallant gum, k-carrageenan, Arabic gum, pectin, carrageenan, gellan gum, xanthan gum, maltodextrin, β-cyclodextrin, gelatin, soy protein isolate and whey protein, preferably sodium alginate, chitosan, and gellan gum, with a ratio of sodium alginate to chitosan to gellan gum of 40:3:5 in parts by weight.

Further, in step (2), the freeze-drying protective agent is one or more of soluble starch, hydroxyethyl starch, resistant dextrin, fructose, glucose, lactose, sucrose, ribose, rhamnose, galactose, fucose, mannose, arabinose, xylan, skimmed milk powder, glycerin, lactitol, sorbitol, mannitol, xylitol, erythritol, maltitol, sodium glutamate, antifreeze peptide, sericin peptide, fish collagen peptide, collagen, and polyvinylpyrrolidone, preferably soluble starch, skimmed milk powder, glycerin and xylan, with a ratio of soluble starch to skimmed milk powder to glycerin to xylan of 5:6:1:10 in parts by weight.

Further, in step (2), an inoculation amount of the probiotics is 1.5 to 4.5% in the mass of the sterile medium; and the sterile medium is an MRS liquid medium.

Further, in step (2), an activation method for the probiotics may be operated by a method disclosed in the prior art, and the low-temperature centrifugation is to carry out centrifugation on the sterile medium inoculated with the probiotics at 3 to 5 °C, with a centrifugation speed of 3500 to 5500 rpm, and centrifugation time of 10 to 20 min.

Further, in step (2), the bacterial sludge is washed with the sterile normal saline for 1 to 3 times, and a mass concentration of the sterile normal saline is 0.85% to 0.95%.

Further, in step (2), in the aqueous solution of the freeze-drying protective agent, a mass fraction of the freeze-drying protective agent is 6% to 20%.

Further, in step (2), the bacterial sludge and the aqueous solution of the freeze-drying protective agent are mixed in a volume ratio of 1:(3 to 5), and then stirred for 10 to 20 min at a stirring speed of 200 to 400 rpm.

Further, in step (2), the probiotics in the bacterial suspension has a concentration of 109 CFU/mL.

Further, in step (2), a mass concentration of the aqueous solution of the natural polymer material is 0.5% to 1.5%, and a volume ratio of the bacterial suspension to the aqueous solution of the natural polymer material is 1:(0.5 to 1.5).

Further, in step (2), the probiotics is solidified with a 0.1 mol/L $CaCl_2$) solution for 20 to 40 min.

Further, in step (2), the low-temperature storage temperature is 3 to 5 °C.

Further, in step (3), the vitamin is at least one of vitamin A, vitamin $D_3$, vitamin E, vitamin $K_2$, vitamin $B_1$, vitamin $B_2$, vitamin $B_6$, vitamin $B_{12}$, vitamin $B_{13}$, vitamin $B_{15}$, vitamin C, biotin, niacinamide, folic acid, inositol, and pantothenic acid; the mineral is at least one of calcium, magnesium, manganese, iron, zinc, cobalt, molybdenum, chromium, copper, selenium, iodine, phosphorus, potassium, sodium, sulfur, and chlorine, preferably, calcium, magnesium, manganese, iron, zinc, selenium and copper; the prebiotics is one of fructooligosaccharides, xylooligosaccharides, galactooligosaccharides, isomaltooligosaccharides, soybean oligosaccharides, mannose oligosaccharides, lactulose, raffinose, stachyose, chitosan oligosaccharides, resistant starch, wheat dextrin, inulin, polydextrose, trehalose, *Aspergillus niger* oligosaccharides, *spirulina*, Arthrospira, *chlorella*, and microalgae, preferably fructooligosaccharides.

In a specific example of the present disclosure, in step (3), the vitamins include vitamin A, vitamin $D_3$, vitamin E, vitamin $K_2$, vitamin $B_1$, vitamin $B_2$, vitamin $B_6$, vitamin $B_{12}$, niacinamide, folic acid, vitamin C, and pantothenic acid; and the minerals include calcium carbonate, magnesium gluconate, manganese sulfate, ferrous lactate, zinc gluconate, sodium selenite, and copper sulfate. The contents of these vitamins and minerals in the vitamin-mineral-prebiotics-natural polymer material mixed solution are: 95 to 128 μg/g of vitamin A, 1 to 6 μg/g of vitamin $D_3$, 1 to 6 mg/g of vitamin E, 6 to 10 μg/g of vitamin $K_2$, 0.1 to 0.6 mg/g of vitamin $B_1$, 0.1 to 0.6 mg/g of vitamin $B_2$, 0.1 to 0.6 mg/g of vitamin $B_6$, 0.1 to 0.7 μg/g of vitamin $B_{12}$, 1 to 7 mg/g of niacinamide, 40 to 80 μg/g of folic acid, 10 to 40 mg/g of vitamin C, and 0.5 to 2.5 mg/g of pantothenic acid; and 93 to 133 mg/g of calcium carbonate, 27 to 51 mg/g of magnesium gluconate, 0.58 to 0.98 mg/g of manganese sulfate, 1 to 5 mg/g of ferrous lactate, 0.1 to 2.5 mg/g of zinc gluconate, 10 to 17 μg/g of sodium selenite, and 0.01 to 0.30 mg/g of copper sulfate.

Further, in step (3), the content of the prebiotics in the vitamin-mineral-prebiotics-natural polymer material mixed solution is 0.3 to 1.0 g/100 mL.

Further, in step (3), the natural polymer material is one or more of sodium alginate, chitosan, modified starch, carboxymethyl cellulose, methyl cellulose, ethyl cellulose, hydroxypropyl cellulose, gallant gum, k-carrageenan, Arabic gum, pectin, carrageenan, gellan gum, xanthan gum, maltodextrin, ß-cyclodextrin, gelatin, soy protein isolate, and whey protein, preferably sodium alginate, chitosan and gellan gum, with a ratio of sodium alginate to chitosan to gellan gum of 40:3:5 in parts by weight.

Further, in step (3), the vitamin-mineral-prebiotics composite powder and the aqueous solution of the natural polymer material are mixed in a mass ratio of (1 to 2):11.

Further, in step (3), a mass concentration of the aqueous solution of the natural polymer material is 2% to 4%.

Further, in step (3), the vitamin-mineral-prebiotics composite powder and the aqueous solution of the natural polymer material are mixed for 10 to 30 min at a rotation speed of 150 to 350 rpm.

Further, in step (4), the enteric coating material is one or more of shellac, algin, diclofenac, acrylic resin No. I, acrylic resin No. II, acrylic resin No. III, cellulose acetate benzenedicarboxylate, cellulose acetate succinate, hydroxypropyl methylcellulose acetate succinate, cellulose acetate phthalate, hydroxypropyl methylcellulose phthalate, cellulose acetate 1,2,4-benzenetricarboxylate, hydroxypropyl methylcellulose 1,2,4-benzenetricarboxylate, hydroxypropyl methylcellulose titanate, and polyvinyl acetate phthalate, preferably hydroxypropyl methylcellulose phthalate.

Further, in step (4), the mixing time of the solidified probiotics and the vitamin-mineral-prebiotics-natural polymer material mixed solution is 10 to 30 min, with a rotation speed of 100 to 300 rpm; and the mixing time of the mixed nutrient solution and the aqueous solution of the enteric coating material is 10 to 30 min, with a rotation speed of 100 to 300 rpm.

Further, in step (4), a mass concentration of the aqueous solution of the enteric coating material is 4% to 12%.

Further, in step (4), the washing is performed with the sterile distilled water for 2 to 4 times.

Further, in step (4), the solidified probiotics and the vitamin-mineral-prebiotics-natural polymer material mixed solution are mixed in a mass ratio of 1:(2 to 4).

Further, in step (4), the mixed nutrient solution and the aqueous solution of the enteric coating material are mixed in a mass ratio of 1:(4 to 6).

Further, in step (5), the wet probiotics-prebiotics-vitamin-mineral microspheres and the wet hydrogel particles are mixed in a mass ratio of 1:(13 to 17).

Further, in step (5), the mixing time of the wet probiotics-prebiotics-vitamin-mineral microspheres and the wet hydrogel particles is 10 to 20 min, with a rotation speed of 30 to 60 rpm.

Further, in step (5), the pre-cooling treatment is performed at −80 °C for 1 to 4 h; and the freeze-drying conditions are as follows: a temperature is −55 °C, a vacuum degree is 25 Pa, and the time is 24 to 48 h.

Further, in step (6), the laser source used in the process of punching with laser is a cold light source, the punched hole has an aperture of 0.5 to 1.5 mm, and the number of the punched holes is 1 to 4.

Further, in step (6), the empty capsule shell is made of one of gelatin, pullulan and glutinous rice starch, preferably gelatin. The empty capsule shell has a model selected from one of 000 #, 00 #, 0 #, 1 #, 2 #, 3 #, 4 # and extended models thereof, preferably 00 # or the extended model thereof.

Further, in step (6), a specific position of the empty capsule shell is punched, wherein the specific position may be both ends of the empty capsule shell, or the waist of the empty capsule shell, or a side wall of the empty capsule shell, or a combination of these positions. Preferably, the punching position may be one of "symmetrical positions in the middle of the waist", "central symmetrical positions at both ends", "equidistant symmetrical positions at both ends and the waist", and "equidistant positions of skew symmetry from the vertex and midline". The symmetrical punching positions in the middle of the waist mean that the middle position on the waist of the empty capsule shell is punched; and the punched holes are distributed in axial symmetry along a central axis of the capsule (as shown in FIGS. 8 and 9). The central symmetrical punching positions at both ends mean that the centers at both ends of the empty capsule shell are punched; and the punched holes are located on the central axis of the empty capsule shell (as shown in FIG. 10). The equidistant symmetrical punching positions at both ends and the waist mean that the symmetrical punching positions in the middle of the waist and the central symmetrical punching positions at both ends are punched at the same time (as shown in FIG. 11). The equidistant punching positions of skew symmetry from the vertex and midline mean that a side wall of the empty capsule shell is punched, wherein the holes are located on a center line of a plane on which the empty capsule shell is located, and a connecting line between the two holes is a diagonal line (as shown in FIG. 12).

Further, in step (6), when the porous capsule shell is combined with the capsule content, a mass of the capsule content contained in each porous capsule shell is 0.60 to 0.75 g.

Further, the components used in the present disclosure are commercially available products, and their structures and compositions are known to those skilled in the art.

The diet-reducing capsule prepared according to the method of the present disclosure includes a porous capsule shell and a capsule content, wherein the capsule content is microspheres containing multiple nutrients (as shown in FIG. 1) and a matrix gel, i.e., hydrogel particles, containing multi-nutrient microspheres (as shown in FIG. 2). The hydrogel particles are of a three-dimensional network structure composed of a polybasic carboxylic acid cross-linked with sodium carboxymethyl cellulose. The hydrogel particles are biomimetic cellulose superabsorbent gel, which can absorb water and expand in the stomach to increase the satiety, and reduce food intake while carrying and promoting the release of microspheres in the gastrointestinal tract. The microsphere containing multiple nutrients is a miniature container composed of probiotics as a core material and protective layers as a wall material, wherein there are three protective layers, including a freeze-drying protective agent layer, a natural polymer material layer embedded with vitamins, minerals and prebiotics, and an enteric coating material layer respectively from inside to outside, so as to improve a colonization rate of probiotics and a utilization rate of nutrient elements. The porous capsule shell is made by punching the capsule shell using a laser technology, and the shell speeds up the disintegration of the capsule by means of fluid dynamics. The capsule can achieve multiple purposes of green weight loss, nutritional supplementation and intestinal tract conditioning, and improve the compliance of a user.

The present disclosure has the following beneficial effects.

(1) The present disclosure organically integrates the four major problems of weight management, intestinal flora regulation, trace organic matter supply and trace element supply together, and develops this diet-reducing capsule. This diet-reducing capsule can play a variety of health care functions at the same time and ensure the effectiveness of time, is more conducive to physical recovery and helps people develop good life habits. In addition, no any other toxic substances or strong oxidizing chemical components is added in the present disclosure, so the prepared diet-reducing capsule is safe and healthy.

(2) The hydrogel particles in the present disclosure can be swollen by absorbing water, occupy a certain volume in the stomach, and form the satiety, so as to reduce the food intake and achieve the purpose of weight loss. The hydrogel particles in the present disclosure have similar mechanical properties as normal vegetables after absorbing water and swelling, and are finally excreted with the formation of feces from food residues. In addition, the administration dosage (within a dosage range) may be adjusted in the present disclosure according to personal circumstances (e.g., appetite) to achieve personalized weight loss. Meanwhile, the intake of vitamins and minerals prevents the development of certain diseases, especially those caused by malnutrition due to reduced food intake, while the probiotics help to regulate the intestines and restore normal physiological functions of flora.

(3) The microspheres containing multiple nutrients of the present disclosure have the following advantages: A, the enteric coating material is added to make the microspheres have the enteric solubility, which can effectively resist the damages from gastric acid and bile salts; the freeze-drying protective agent is added to reduce the appearance of micro ice crystals in the freeze-drying process of the microspheres, and reduce the probability of micro ice crystals damaging probiotic bacteria; and the prebiotics is added to not only provide nutrients for the intestinal colonization of probiotics, but also be directly absorbed by the human body, increasing the nutritional value. B. The natural polymer materials package the prebiotics, the vitamins and the minerals to reduce their direct contact with the probiotics, and avoid adverse effects such as reduced efficacy caused by the interaction of the prebiotics, the vitamins, the minerals and the probiotics. C. The microspheres prepared by the method of the present disclosure have a number of viable bacteria up to $10^8$ CFU/g, a probiotics embedding rate of more than 80%, a vitamin embedding rate of more than 80%, a mineral embedding rate of more than 70%, and a prebiotics embedding rate of more than 75%. Such microspheres can effectively improve the acid resistance, the salt resistance and the long-term storage of the probiotics, and also significantly improve a low survival rate of the probiotics after freeze-drying.

(4) According to the present disclosure, the wet hydrogel particles and the wet multi-nutrient microspheres (i.e., wet probiotics-prebiotics-vitamin-mineral microspheres) are mixed and then freeze-dried. With such process, the microspheres can be attached to the surfaces of the hydrogel particles or be entrained among the hydrogel particles to provide a brief stable microenvironment for the presence of the microspheres, and also prepare for the next release of the microspheres, which is conducive to improving the utilization rates of the prebiotics, the probiotics, the vitamins and the minerals, as well as their absorption and metabolism in the body.

(5) The present disclosure introduces a laser punching technology to punch small holes in a specific position of the capsule shell, and an aperture range is set based on a standard that the capsule content will not escape. This change in the appearance of the capsule shell may not have any adverse effects on safety and efficacy issues, but can speed up the dissolution of gastric juice to the capsule shell, thereby accelerating the release of the capsule content, and ultimately making the satiety more timely, which can effectively improve the user's enthusiasm and compliance, generate a sense of trust, enhance the self-confidence, and be more conducive to the formation of their own good life habits.

(6) The preparation method of the diet-reducing capsule of the present disclosure is simple to operate, economical and easy to implement, and is suitable for industrial production.

BRIEF DESCRIPTION OF THE DRAWINGS

In FIGS. 8 to 12,

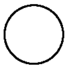

Figure 1:
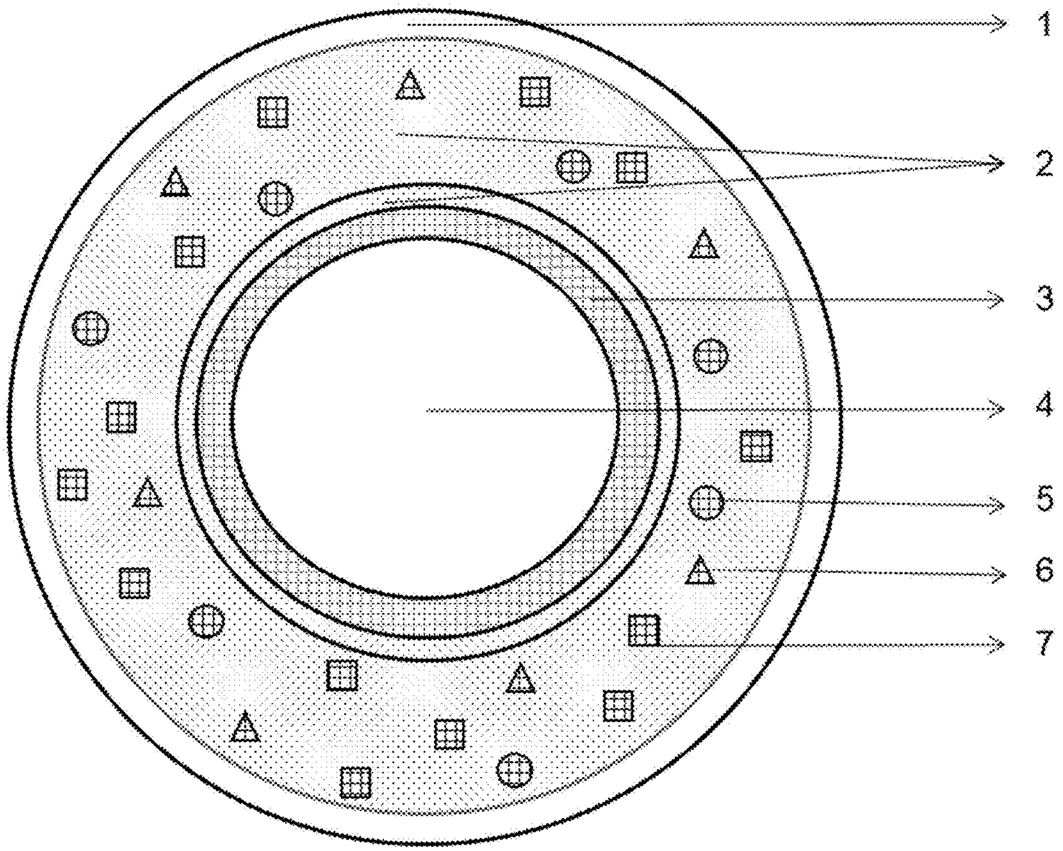
FIG. 1 is a morphological diagram of multi-nutrient microspheres, wherein 1 indicates an enteric coating material layer, 2 indicates a natural polymer material layer, 3 indicates a freeze-drying protective agent layer, 4 indicates a probiotics core, 5 indicates a vitamin, 6 indicates a mineral, and 7 indicates prebiotics.
Figure 2:
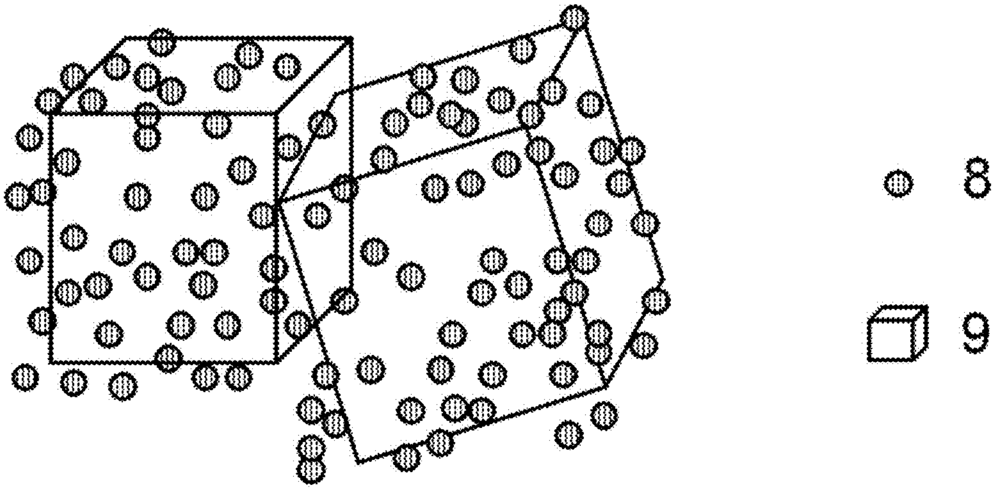
FIG. 2 is a morphological diagram of matrix gel particles containing the multi-nutrient microspheres, wherein 8 indicates the multi-nutrient microspheres, and 9 indicates the matrix gel particles.

indicates that there is a hole in the front of the empty capsule shell,

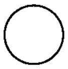

indicates that there is a hole in the back of the empty capsule shell, and

indicates that there is a hole in the side of the empty capsule shell.

DESCRIPTION OF THE EMBODIMENTS

The present disclosure will be further described in detail below in conjunction with specific examples, comparative examples and accompanying drawings.

In the following examples and comparative examples, unless otherwise specified, the concentrations are all in percentage by mass.

In the following examples and comparative examples, unless otherwise specified, all sterilization operations in a sterile aqueous solution, an MRS medium, etc. are carried out by a moist heat sterilization method, wherein a sterilization temperature is 121 °C and the sterilization time is 20 min.

In the following examples and comparative examples, unless otherwise specified, in step (2), the probiotics is all mixed flora composed of *Bifidobacterium longum* and *Lactobacillus acidophilus*; the freeze-drying protective agents are soluble starch, skimmed milk powder, glycerol and xylan (a ratio of soluble starch to skimmed milk powder to glycerol to xylan is 5:6:1:10 in parts by weight), and a concentration of the probiotics in the bacterial suspension is 109 CFU/mL; in steps (2) and (3), the natural polymer materials are sodium alginate, chitosan and gellan gum (a ratio of sodium alginate to chitosan to gellan gum is 40:3:5 in parts by weight); in step (3), the prebiotics is fructooligosaccharides; in step (4), the enteric coating material is hydroxypropyl methylcellulose phthalate; and in step (6), all the empty capsule shells are made of gelatin, all in 00 # type, and a mass of the capsule content contained in the diet-reducing capsule is 0.75 g/capsule.

Example 1

Figure 8:
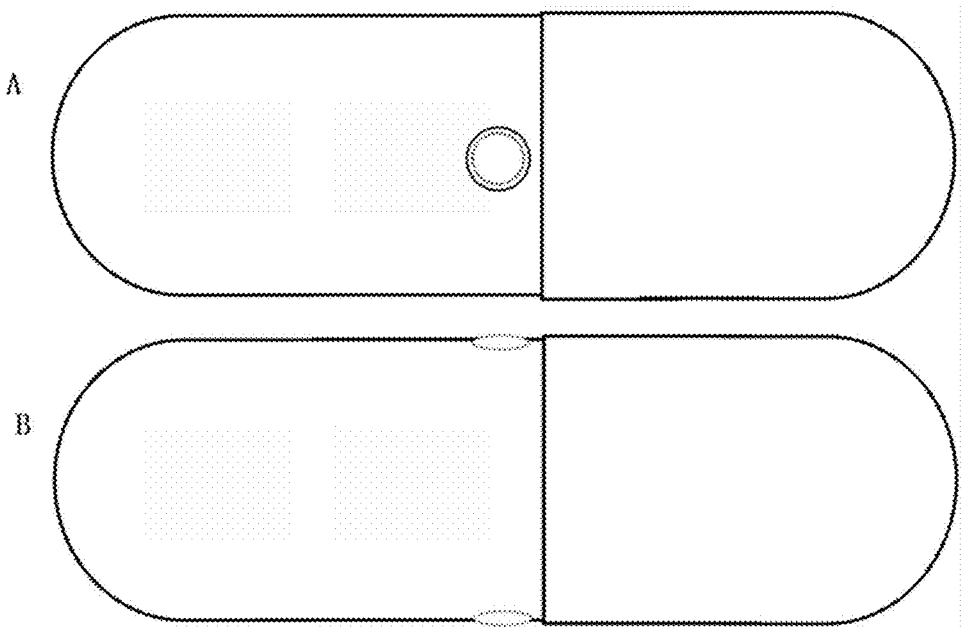
FIG. 8 is a schematic diagram of holes (two holes) in symmetrical positions in the middle of the waist, where A indicates a front, and B indicates a side.
Figure 9:
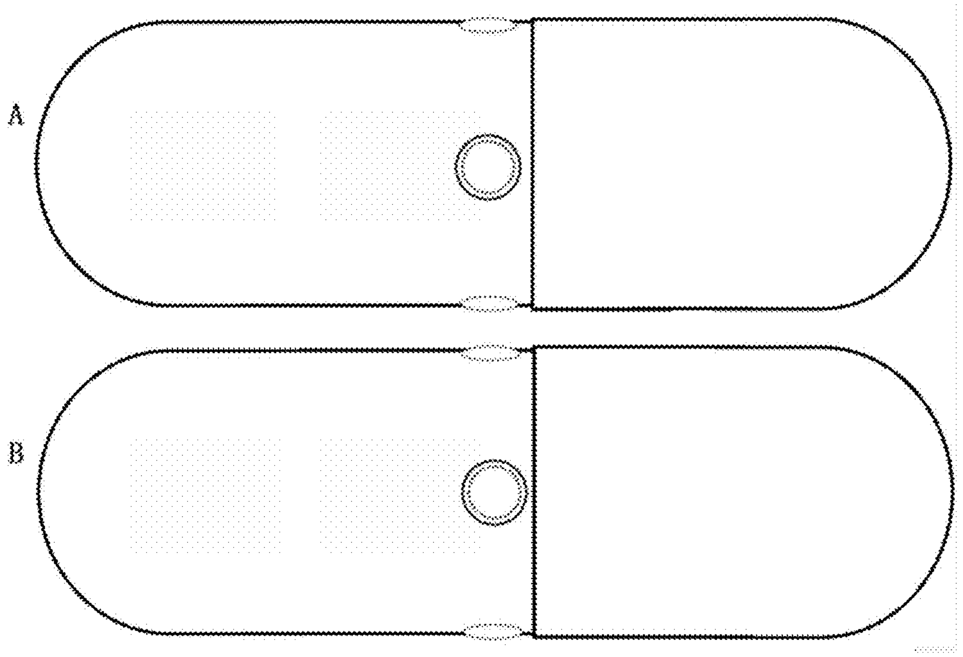
FIG. 9 is a schematic diagram of holes (four holes) in symmetrical positions in the middle of the waist, where A indicates a front, and B indicates a side.
Figure 10:
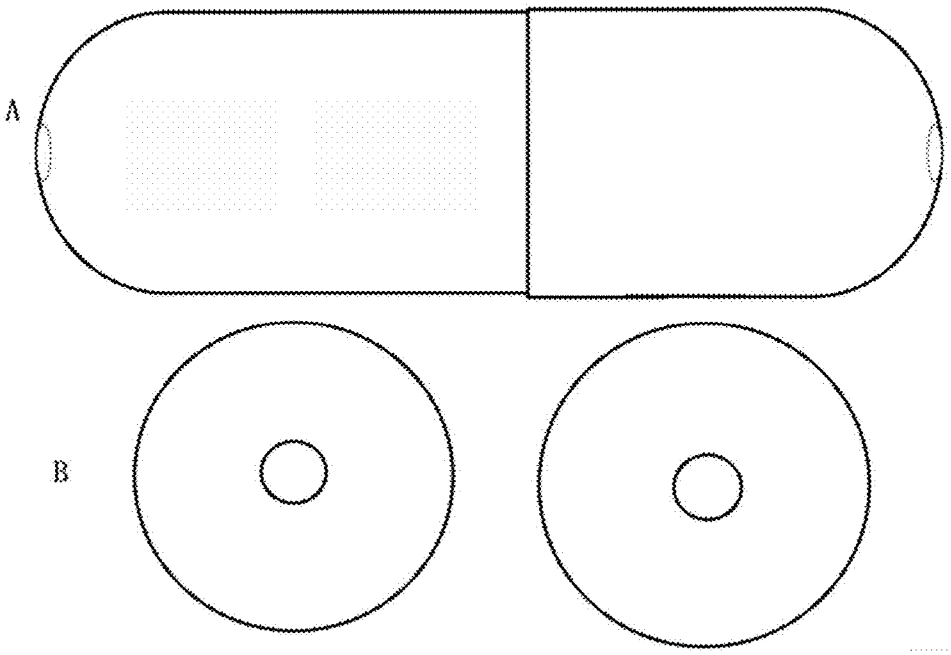
FIG. 10 is a schematic diagram of holes (two holes) in central symmetrical positions at both ends, where A indicates a front, and B indicates a top.

Step (1), sodium carboxymethyl cellulose (a viscosity of 11000) was added to an aqueous solution containing citric acid (a mass ratio of sodium carboxymethyl cellulose to citric acid was 330:1, and a mass ratio of sodium carboxymethyl cellulose to distilled water was 1:16) to obtain a mixture; the mixture was stirred at 60 rpm for 90 min, and then stirred for at 30 rpm 16 h to obtain a gel; the gel was dried in a drying oven at 45 °C for 24 h, turned over and continued to dry for 32 h, then cross-linked at high temperature of 120 °C for 4 h, crushed and sieved to obtain solid hydrogel particles; the solid hydrogel particles were washed with distilled water for 4 times, 3 h each time (a mass ratio of the solid hydrogel particles to the distilled water was 1:150 in each washing), and filtered to obtain wet hydrogel particles;

Step (2), probiotics was inoculated in a sterile MRS liquid medium according to an inoculation amount of 3%, and repeatedly activated for 5 generations under the same culture conditions (36.5 °C, 24 h); bacterial sludge was collected by low-temperature centrifugation (4 °C, 4500 rpm, 15 min), and washed twice with 0.9% sterile normal saline; the washed bacterial sludge was then mixed evenly with an aqueous solution of a freeze-drying protective agent having a concentration of 13% according to a volume ratio of 1:4 to obtain a bacterial suspension; the bacterial suspension was then mixed evenly with an aqueous solution of a natural polymer material having a concentration of 1% according to a volume ratio of 1:1 to obtain a mixed solution; the obtained mixed solution was then solidified with a 0.1 mol/L $CaCl_2$) solution for 30 min, washed and filtered to obtain solidified probiotics; the solidified probiotics was stored at a low temperature of 4 °C for later use;

Step (3), powders of vitamins, minerals and prebiotics were mixed evenly, and sieved with a 70-mesh sieve to obtain vitamin-mineral-prebiotics composite powder; and the vitamin-mineral-prebiotics composite powder was then mixed (250 rpm, 20 min) evenly with the aqueous solution of the natural polymer material having a concentration of 3% according to a mass ratio of 1.5:11 to obtain a vitamin-mineral-prebiotics-natural polymer material mixed solution, wherein in the mixed solution, the contents of the vitamins, the minerals and the prebiotics were: 111 μg/g of vitamin A, 4 μg/g of vitamin $D_3$, 4 mg/g of vitamin E, 8 μg/g of vitamin $K_2$, 0.4 mg/g of vitamin $B_1$, 0.4 mg/g of vitamin $B_2$, 0.4 mg/g of vitamin $B_6$, 0.4 μg/g of vitamin $B_{12}$, 4 mg/g of niacinamide, 60 μg/g of folic acid, 25 mg/g of vitamin C, and 1.5 mg/g of pantothenic acid; 113 mg/g of calcium carbonate, 39 mg/g of magnesium gluconate, 0.78 mg/g of manganese sulfate, 3 mg/g of ferrous lactate, 1.5 mg/g of zinc gluconate, 14 μg/g of sodium selenite, and 0.16 mg/g of copper sulfate; and the prebiotics content was 0.65 g/100 mL;

Step (4), the solidified probiotics was mixed (200 rpm, 20 min) evenly with the vitamin-mineral-prebiotics-natural polymer material mixed solution according to a mass ratio of 1:3 to obtain a mixed nutrient solution, and the mixed nutrient solution was then mixed with an aqueous solution of an enteric coating material having a concentration of 8% according to a mass ratio of 1:5, washed for 3 times and filtered to obtain wet probiotics-prebiotics-vitamin-mineral microspheres;

Step (5), the wet probiotics-prebiotics-vitamin-mineral microspheres were mixed (45 rpm, 15 min) evenly with the wet hydrogel particles according to a mass ratio of 1:15 to obtain a mixture; the mixture was then pre-cooled at −80 °C for 2.5 h, and then freeze-dried at −55° °C for 36 h under a vacuum degree of 25 Pa to obtain a freeze-dried product; the freeze-dried product was then crushed and sieved to obtain a capsule content; and Step (6), an empty capsule shell was fixed and punched with two holes, each having an aperture of 1 mm, in symmetrical positions in the middle of the waist with laser (as shown in FIG. 8) to obtain a porous capsule shell; and the porous capsule shell was then combined with the capsule content to obtain the diet-reducing capsule containing multi-nutrient microspheres.

Example 2

Step (1), sodium carboxymethyl cellulose (a viscosity of 15000) was added to an aqueous solution containing citric acid (a mass ratio of sodium carboxymethyl cellulose to citric acid was 350:1, and a mass ratio of sodium carboxymethyl cellulose to distilled water was 1:10) to obtain a mixture; the mixture was first stirred at 70 rpm for 100 min, and then stirred at 40 rpm for 20 h to obtain a gel; the gel was dried in a drying oven at 60 °C for 28 h, turned over and continued to dry for 36 h, then cross-linked at high temperature of 125 °C for 4.4 h, crushed and sieved to obtain solid hydrogel particles; the solid hydrogel particles were washed with distilled water for 6 times, 4 h each time (a mass ratio of the solid hydrogel particles to the distilled water was 1:200 in each washing), and filtered to obtain wet hydrogel particles;

Step (2), probiotics was inoculated in a sterile MRS liquid medium according to an inoculation amount of 4.5%, and repeatedly activated for 5 generations under the same culture conditions (38 °C, 27 h); bacterial sludge was collected by low-temperature centrifugation (5 °C, 5500 rpm, 20 min), and washed with 0.95% sterile normal saline for 3 times; the washed bacterial sludge was then mixed evenly with an aqueous solution of a freeze-drying protective agent having a concentration of 20% according to a volume ratio of 1:5 to obtain a bacterial suspension; the bacterial suspension was then mixed evenly with an aqueous solution of a natural polymer material having a concentration of 1.5% according to a volume ratio of 1:1.5 to obtain a mixed solution; the obtained mixed solution was then solidified with a 0.1 mol/L $CaCl_2$) solution for 40 min, washed and filtered to obtain solidified probiotics; the solidified probiotics was stored at a low temperature of 5° °C for later use;

Step (3), powders of vitamins, minerals and prebiotics were mixed evenly, and sieved with a 70-mesh sieve to obtain vitamin-mineral-prebiotics composite powder; and the vitamin-mineral-prebiotics composite powder was then mixed (350 rpm, 30 min) evenly with the aqueous solution of the natural polymer material having a concentration of 4% according to a mass ratio of 2:11 to obtain a vitamin-mineral-prebiotics-natural polymer material mixed solution, wherein in the mixed solution, the contents of the vitamins, the minerals and the prebiotics were: 128 μg/g of vitamin A, 6 μg/g of vitamin $D_3$, 6 mg/g of vitamin E, 10 μg/g of vitamin $K_2$, 0.6 mg/g of vitamin $B_1$, 0.6 mg/g of vitamin $B_2$, 0.6 mg/g of vitamin $B_6$, 0.7 μg/g of vitamin $B_{12}$, 7 mg/g of niacinamide, 80 μg/g of folic acid, 40 mg/g of vitamin C, and 2.5 mg/g of pantothenic acid; 133 mg/g of calcium carbonate, 51 mg/g of magnesium gluconate, 0.98 mg/g of manganese sulfate, 5 mg/g of ferrous lactate, 2.5 mg/g of zinc gluconate, 17 μg/g of sodium selenite, and 0.3 mg/g of copper sulfate; and the prebiotics content was 1.0 g/100 mL;

Step (4), the solidified probiotics was mixed (300 rpm, 30 min) evenly with the vitamin-mineral-prebiotics-natural polymer material mixed solution according to a mass ratio of 1:4 to obtain a mixed nutrient solution, and the mixed nutrient solution was then mixed evenly with an aqueous solution of an enteric coating material having a concentration of 8% according to a mass ratio of 1:6, washed for 4 times and filtered to obtain wet probiotics-prebiotics-vitamin-mineral microspheres;

Step (5), the wet probiotics-prebiotics-vitamin-mineral microspheres were mixed (60 rpm, 20 min) evenly with the wet hydrogel particles according to a mass ratio of 1:17 to obtain a mixture; the mixture was then precooled at −80° °C for 4 h, and then freeze-dried at −55 °C for 48 h under a vacuum degree of 25 Pa to obtain a freeze-dried product; the freeze-dried product was then crushed and sieved to obtain a capsule content; and Step (6), an empty capsule shell was fixed and punched with two holes, each having an aperture of 1 mm, in symmetrical positions in the middle of the waist with laser to obtain a porous capsule shell; and the porous capsule shell was then combined with the capsule content to obtain the diet-reducing capsule containing multi-nutrient microspheres.

Example 3

Step (1), sodium carboxymethyl cellulose (a viscosity of 7000) was added to an aqueous solution containing citric acid (a mass ratio of sodium carboxymethyl cellulose to citric acid was 310:1, and a mass ratio of sodium carboxymethyl cellulose to distilled water was 1:22) to obtain a mixture; the mixture was first stirred at 50 rpm for 80 min, and then stirred at 20 rpm for 14 h to obtain a gel; the gel was dried in a drying oven at 40 °C for 20 h, turned over and continued to dry for 28 h, then cross-linked at high temperature of 110 °C for 3.6 h, crushed and sieved to obtain solid hydrogel particles; the solid hydrogel particles were washed twice with distilled water, 2 h each time (a mass ratio of the solid hydrogel particles to the distilled water was 1:100 in each washing), and filtered to obtain wet hydrogel particles;

Step (2), probiotics was inoculated in a sterile MRS liquid medium according to an inoculation amount of 1.5%, and repeatedly activated for 5 generations under the same culture conditions (35 °C, 21 h); bacterial sludge was collected by low-temperature centrifugation (3 °C, 3500 rpm, 10 min), and washed once with 0.85% sterile normal saline; the washed bacterial sludge was then mixed evenly with an aqueous solution of a freeze-drying protective agent having a concentration of 6% according to a volume ratio of 1:3 to obtain a bacterial suspension; the bacterial suspension was then mixed evenly with an aqueous solution of a natural polymer material having a concentration of 0.5% according to a volume ratio of 1:0.5 to obtain a mixed solution; the obtained mixed solution was then solidified with a 0.1 mol/L $CaCl_2$) solution for 20 min, washed and filtered to obtain solidified probiotics; and the solidified probiotics was stored at a low temperature of 3 °C for later use;

Step (3), powders of vitamins, minerals and prebiotics were mixed evenly, and sieved with a 70-mesh sieve to obtain vitamin-mineral-prebiotics composite powder; and the vitamin-mineral-prebiotics composite powder was then mixed (150 rpm, 10 min) evenly with the aqueous solution of the natural polymer material having a concentration of 3% according to a mass ratio of 1:11 to obtain a vitamin-mineral-prebiotics-natural polymer material mixed solution, wherein in the mixed solution, the contents of the vitamins, the minerals and the prebiotics were: 95 μg/g of vitamin A, 1 μg/g of vitamin $D_3$, 1 mg/g of vitamin E, 6 μg/g of vitamin $K_2$, 0.1 mg/g of vitamin $B_1$, 0.1 mg/g of vitamin $B_2$, 0.1 mg/g of vitamin $B_6$, 0.1 μg/g of vitamin $B_{12}$, 1 mg/g of niacinamide, 40 μg/g of folic acid, 10 mg/g of vitamin C, and 0.5 mg/g of pantothenic acid; the minerals include 93 mg/g of calcium carbonate, 27 mg/g of magnesium gluconate, 0.58 mg/g of manganese sulfate, 1 mg/g of ferrous lactate, 0.1 mg/g of zinc gluconate, 10 μg/g of sodium selenite, and 0.01 mg/g of copper sulfate; and the prebiotics content was 0.3 g/100 mL;

Step (4), the solidified probiotics was mixed (100 rpm, 10 min) evenly with the vitamin-mineral-prebiotics-natural polymer material mixed solution according to a mass ratio of 1:2 to obtain a mixed nutrient solution, and the mixed nutrient solution was then mixed evenly with an aqueous solution of an enteric coating material having a concentration of 8% according to a mass ratio of 1:4, washed twice and filtered to obtain wet probiotics-prebiotics-vitamin-mineral microspheres;

Step (5), the wet probiotics-prebiotics-vitamin-mineral microspheres were mixed (30 rpm, 10 min) evenly with the wet hydrogel particles according to a mass ratio of 1:13 to obtain a mixture; the mixture was then pre-cooled at −80 °C for 1 h, and then freeze-dried at −55 °C for 24 h under a vacuum degree of 25 Pa to obtain a freeze-dried product; the freeze-dried product was then crushed and sieved to obtain a capsule content; and Step (6), an empty capsule shell was fixed and punched with two holes, each having an aperture of 1 mm, in central symmetrical positions at both ends of the entire shell with laser to obtain a porous capsule shell; and the porous capsule shell was then combined with the capsule content to obtain the diet-reducing capsule containing multi-nutrient microspheres.

Example 4

Figure 11:
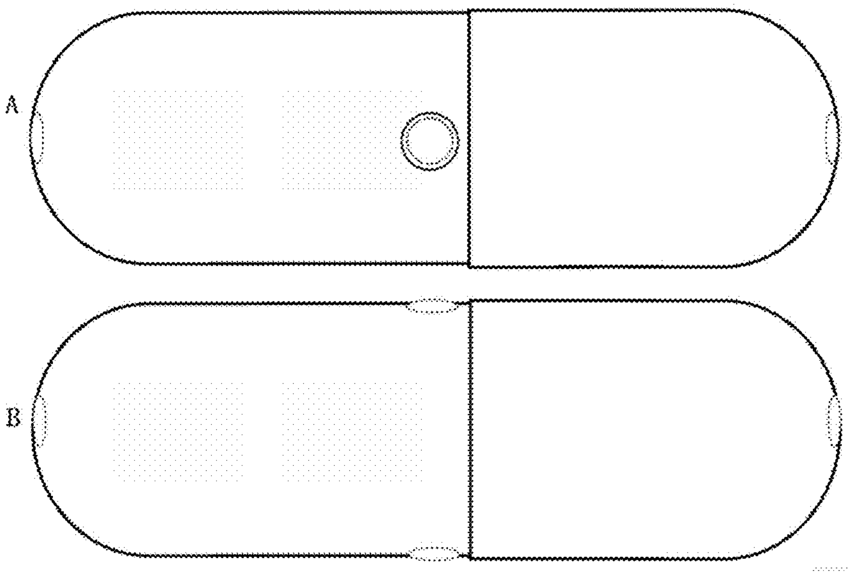
FIG. 11 is a schematic diagram of holes (four holes) in equidistant symmetrical positions at both ends and the waist, where A indicates a front, and B indicates a side.

Step (1), sodium carboxymethyl cellulose (a viscosity of 11000) was added to an aqueous solution containing citric acid (a mass ratio of sodium carboxymethyl cellulose to citric acid was 350:1, and a mass ratio of sodium carboxymethyl cellulose to distilled water was 1:10) to obtain a mixture; the mixture was first stirred at 60 rpm for 90 min, and then stirred at 40 rpm for 20 h to obtain a gel; the gel was dried in a drying oven at 40° °C for 20 h, turned over and continued to dry for 28 h, then cross-linked at high temperature of 120° °C for 4 h, crushed and sieved to obtain solid hydrogel particles; the solid hydrogel particles were washed with distilled water for 6 times, 4 h each time (a mass ratio of the solid hydrogel particles to the distilled water was 1:200 in each washing), and filtered to obtain wet hydrogel particles;

Step (2), probiotics was inoculated in a sterile MRS liquid medium according to an inoculation amount of 1.5%, and repeatedly activated for 5 generations under the same culture conditions (36.5 °C, 24 h); bacterial sludge was collected by low-temperature centrifugation (5 °C, 5500 rpm, 20 min), and washed once with 0.85% sterile normal saline; the washed bacterial sludge was then mixed evenly with an aqueous solution of a freeze-drying protective agent having a concentration of 13% according to a volume ratio of 1:3 to obtain a bacterial suspension; the bacterial suspension was then mixed evenly with an aqueous solution of a natural polymer material having a concentration of 1% according to a volume ratio of 1:0.5 to obtain a mixed solution; the obtained mixed solution was then solidified with a 0.1 mol/L $CaCl_2$) solution for 30 min, washed and filtered to obtain solidified probiotics; and the solidified probiotics was stored at a low temperature of 4 °C for later use;

Step (3), powders of vitamins, minerals and prebiotics were mixed evenly, and sieved with a 70-mesh sieve to obtain vitamin-mineral-prebiotics composite powder; and the vitamin-mineral-prebiotics composite powder was then mixed (250 rpm, 20 min) evenly with the aqueous solution of the natural polymer material having a concentration of 2% according to a mass ratio of 1:11 to obtain a vitamin-mineral-prebiotics-natural polymer material mixed solution, wherein in the mixed solution, the contents of the vitamins, the minerals and the prebiotics were: 111 μg/g of vitamin A, 4 μg/g of vitamin $D_3$, 4 mg/g of vitamin E, 8 μg/g of vitamin $K_2$, 0.4 mg/g of vitamin $B_1$, 0.4 mg/g of vitamin $B_2$, 0.4 mg/g of vitamin $B_6$, 0.4 μg/g of vitamin $B_{12}$, 4 mg/g of niacinamide, 60 μg/g of folic acid, 25 mg/g of vitamin C, and 1.5 mg/g of pantothenic acid; the minerals include 113 mg/g of calcium carbonate, 39 mg/g of magnesium gluconate, 0.78 mg/g of manganese sulfate, 3 mg/g of ferrous lactate, 1.5 mg/g of zinc gluconate, 14 μg/g of sodium selenite, and 0.16 mg/g of copper sulfate; and the prebiotics content was 0.65 g/100 mL;

Step (4), the solidified probiotics was mixed (350 rpm, 30 min) evenly with the vitamin-mineral-prebiotics-natural polymer material mixed solution according to a mass ratio of 1:2 to obtain a mixed nutrient solution, and the mixed nutrient solution was then mixed evenly with an aqueous solution of an enteric coating material having a concentration of 8% according to a mass ratio of 1:6, washed for 3 times and filtered to obtain wet probiotics-prebiotics-vitamin-mineral microspheres;

Step (5), the wet probiotics-prebiotics-vitamin-mineral microspheres were mixed (45 rpm, 15 min) evenly with the wet hydrogel particles according to a mass ratio of 1:15 to obtain a mixture; the mixture was then pre-cooled at −80 °C for 2.5 h, and then freeze-dried at −55 °C for 36 h under a vacuum degree of 25 Pa to obtain a freeze-dried product; the freeze-dried product was then crushed and sieved to obtain a capsule content; and Step (6), an empty capsule shell was fixed and punched with four holes, each having an aperture of 1 mm, in equidistant symmetrical positions at both ends and the waist of the entire shell with laser (as shown in FIG. 11) to obtain a porous capsule shell; and the porous capsule shell was then combined with the capsule content to obtain the diet-reducing capsule containing multi-nutrient microspheres.

Example 5

Figure 12:
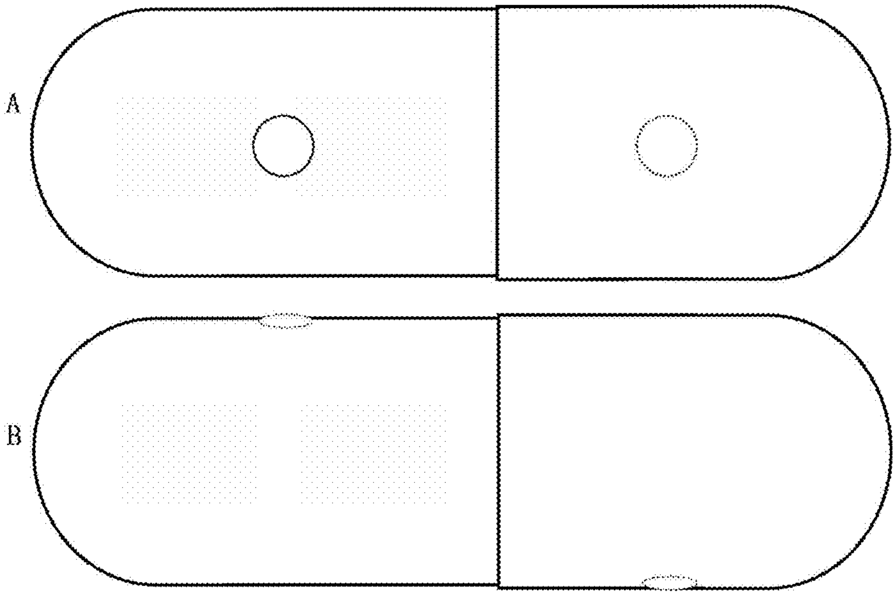
FIG. 12 is a schematic diagram of holes (two holes) in equidistant positions of skew symmetry from the vertex and midline, where A indicates a front, and B indicates a side.

Step (1), sodium carboxymethyl cellulose (a viscosity of 15000) was added to an aqueous solution containing citric acid (a mass ratio of sodium carboxymethyl cellulose to citric acid was 310:1, and a mass ratio of sodium carboxymethyl cellulose to distilled water was 1:16) to obtain a mixture; the mixture was first stirred at 70 rpm for 100 min, and then stirred at 20 rpm for 14 h to obtain a gel; the gel was dried in a drying oven at 45 °C for 24 h, turned over and continued to dry for 32 h, then cross-linked at high temperature of 130° °C for 4.4 h, crushed and sieved to obtain solid hydrogel particles; the solid hydrogel particles were washed twice with distilled water, 2 h each time (a mass ratio of the solid hydrogel particles to the distilled water was 1:100 in each washing), and filtered to obtain wet hydrogel particles;

Step (2), probiotics was inoculated in a sterile MRS liquid medium according to an inoculation amount of 3%, and repeatedly activated for 5 generations under the same culture conditions (38 °C, 27 h); bacterial sludge was collected by low-temperature centrifugation (5 °C, 5500 rpm, 25 min), and washed twice with 0.9% sterile normal saline; the washed bacterial sludge was then mixed evenly with an aqueous solution of a freeze-drying protective agent having a concentration of 20% according to a volume ratio of 1:3 to obtain a bacterial suspension; the bacterial suspension was then mixed evenly with an aqueous solution of a natural polymer material having a concentration of 1.5% according to a volume ratio of 1:1 to obtain a mixed solution; the obtained mixed solution was then solidified with a 0.1 mol/L $CaCl_2$) solution for 40 min, washed and filtered to obtain solidified probiotics; and the solidified probiotics was stored at a low temperature of 5 °C for later use;

Step (3), powders of vitamins, minerals and prebiotics were mixed evenly, and sieved with a 70-mesh sieve to obtain vitamin-mineral-prebiotics composite powder; and the vitamin-mineral-prebiotics composite powder was then mixed (150 rpm, 30 min) evenly with the aqueous solution of the natural polymer material having a concentration of 4% according to a mass ratio of 1:11 to obtain a vitamin-mineral-prebiotics-natural polymer material mixed solution, wherein in the mixed solution, the contents of the vitamins, the minerals and the prebiotics were: 111 μg/g of vitamin A, 4 μg/g of vitamin $D_3$, 4 mg/g of vitamin E, 8 μg/g of vitamin $K_2$, 0.4 mg/g of vitamin $B_1$, 0.4 mg/g of vitamin $B_2$, 0.4 mg/g of vitamin $B_6$, 0.4 μg/g of vitamin $B_{12}$, 4 mg/g of niacinamide, 60 μg/g of folic acid, 25 mg/g of vitamin C, and 1.5 mg/g of pantothenic acid; the minerals include 113 mg/g of calcium carbonate, 39 mg/g of magnesium gluconate, 0.78 mg/g of manganese sulfate, 3 mg/g of ferrous lactate, 1.5 mg/g of zinc gluconate, 14 μg/g of sodium selenite, and 0.16 mg/g of copper sulfate; and the prebiotics content was 0.65 g/100 mL;

Step (4), the solidified probiotics was mixed (200 rpm, 20 min) evenly with the vitamin-mineral-prebiotics-natural polymer material mixed solution according to a mass ratio of 1:3 to obtain a mixed nutrient solution, and the mixed nutrient solution was then mixed with an aqueous solution of an enteric coating material having a concentration of 8% according to a mass ratio of 1:6, washed for 3 times and filtered to obtain wet probiotics-prebiotics-vitamin-mineral microspheres;

Step (5), the wet probiotics-prebiotics-vitamin-mineral microspheres were mixed (60 rpm, 20 min) evenly with the wet hydrogel particles according to a mass ratio of 1:17 to obtain a mixture; the mixture was then pre-cooled at −80° °C for 4 h, and then freeze-dried at −55 °C for 48 h under a vacuum degree of 25 Pa to obtain a freeze-dried product; the freeze-dried product was then crushed and sieved to obtain a capsule content; and Step (6), an empty capsule shell was fixed and punched with two holes, each having an aperture of 1 mm, in equidistant positions of skew symmetry from the vertex and midline of the entire capsule with laser (as shown in FIG. 12) to obtain a porous capsule shell; and the porous capsule shell was then combined with the capsule content to obtain the diet-reducing capsule containing multi-nutrient microspheres.

Example 6

Step (1), sodium carboxymethyl cellulose (a viscosity of 7000) was added to an aqueous solution containing citric acid (a mass ratio of sodium carboxymethyl cellulose to citric acid was 330:1, and a mass ratio of sodium carboxymethyl cellulose to distilled water was 1:22) to obtain a mixture; the mixture was first stirred at 50 rpm for 80 min, and then stirred at 30 rpm for 16 h to obtain a gel; the gel was dried in a drying oven at 60 °C for 28 h, turned over and continued to dry for 36 h, then cross-linked at high temperature of 110° °C for 3.6 h, crushed and sieved to obtain solid hydrogel particles; the solid hydrogel particles were washed with distilled water for 4 times, 3 h each time (a mass ratio of the solid hydrogel particles to the distilled water was 1:150 in each washing), and filtered to obtain wet hydrogel particles;

Step (2), probiotics was inoculated in a sterile MRS liquid medium according to an inoculation amount of 4.5%, and repeatedly activated for 5 generations under the same culture conditions (35 °C, 21 h); bacterial sludge was collected by low-temperature centrifugation (4 °C, 4500 rpm, 15 min), and washed with 0.95% sterile normal saline for 3 times; the washed bacterial sludge was then mixed evenly with an aqueous solution of a freeze-drying protective agent having a concentration of 6% according to a volume ratio of 1:5 to obtain a bacterial suspension; the bacterial suspension was then mixed evenly with an aqueous solution of a natural polymer material having a concentration of 1% according to a volume ratio of 1:1 to obtain a mixed solution; the obtained mixed solution was then solidified with a 0.1 mol/L $CaCl_2$) solution for 20 min, washed and filtered to obtain solidified probiotics; and the solidified probiotics was stored at a low temperature of 3 °C for later use;

Step (3), powders of vitamins, minerals and prebiotics were mixed evenly, and sieved with a 70-mesh sieve to obtain vitamin-mineral-prebiotics composite powder; and the vitamin-mineral-prebiotics composite powder was then mixed (350 rpm, 30 min) evenly with the aqueous solution of the natural polymer material having a concentration of 4% according to a mass ratio of 2:11 to obtain a vitamin-mineral-prebiotics-natural polymer material mixed solution, wherein in the mixed solution, the contents of the vitamins, the minerals and the prebiotics were: 128 μg/g of vitamin A, 6 μg/g of vitamin $D_3$, 6 mg/g of vitamin E, 10 μg/g of vitamin $K_2$, 0.6 mg/g of vitamin $B_1$, 0.6 mg/g of vitamin $B_2$, 0.6 mg/g of vitamin $B_6$, 0.7 μg/g of vitamin $B_{12}$, 7 mg/g of niacinamide, 80 μg/g of folic acid, 40 mg/g of vitamin C, and 2.5 mg/g of pantothenic acid; the minerals include 133 mg/g of calcium carbonate, 51 mg/g of magnesium gluconate, 0.98 mg/g of manganese sulfate, 5 mg/g of ferrous lactate, 2.5 mg/g of zinc gluconate, 17 μg/g of sodium selenite, and 0.3 mg/g of copper sulfate; and the prebiotics content was 1.0 g/100 mL;

Step (4), the solidified probiotics was mixed (300 rpm, 30 min) evenly with the vitamin-mineral-prebiotics-natural polymer material mixed solution according to a mass ratio of 1:4 to obtain a mixed nutrient solution, and the mixed nutrient solution was then mixed evenly with an aqueous solution of an enteric coating material having a concentration of 8% according to a mass ratio of 1:4, washed for 4 times and filtered to obtain wet probiotics-prebiotics-vitamin-mineral microspheres;

Step (5), the wet probiotics-prebiotics-vitamin-mineral microspheres were mixed (30 rpm, 10 min) evenly with the wet hydrogel particles according to a mass ratio of 1:13 to obtain a mixture; the mixture was then pre-cooled at −80° °C for 1 h, and then freeze-dried at −55 °C for 18 h under a vacuum degree of 25 Pa to obtain a freeze-dried product; the freeze-dried product was then crushed and sieved to obtain a capsule content; and Step (6), an empty capsule shell was fixed and punched with two holes, each having an aperture of 1 mm, in symmetrical positions in the middle of the waist with laser to obtain a porous capsule shell; and the porous capsule shell was then combined with the capsule content to obtain the diet-reducing capsule containing multi-nutrient microspheres.

Example 7

Step (1), sodium carboxymethyl cellulose (a viscosity of 11000) was added to an aqueous solution containing citric acid (a mass ratio of sodium carboxymethyl cellulose to citric acid was 310:1, and a mass ratio of sodium carboxymethyl cellulose to distilled water was 1:22) to obtain a mixture; the mixture was first stirred at 60 rpm for 90 min, and then stirred at 20 rpm for 14 h to obtain a gel; the gel was dried in a drying oven at 60 °C for 28 h, turned over and continued to dry for 36 h, then cross-linked at high temperature of 120 °C for 4 h, crushed and sieved to obtain solid hydrogel particles; the solid hydrogel particles were washed twice with distilled water, 2 h each time (a mass ratio of the solid hydrogel particles to the distilled water was 1:100 in each washing), and filtered to obtain wet hydrogel particles;

Step (2), probiotics was inoculated in a sterile MRS liquid medium according to an inoculation amount of 4.5%, and repeatedly activated for 5 generations under the same culture conditions (36.5 °C, 24 h); bacterial sludge was collected by low-temperature centrifugation (3 °C, 3500 rpm, 10 min), and washed twice with 0.95% sterile normal saline; the washed bacterial sludge was then mixed evenly with an aqueous solution of a freeze-drying protective agent having a concentration of 6% according to a volume ratio of 1:5 to obtain a bacterial suspension; the bacterial suspension was then mixed evenly with an aqueous solution of a natural polymer material having a concentration of 1.5% according to a volume ratio of 1:1.5 to obtain a mixed solution; the obtained mixed solution was then solidified with a 0.1 mol/L $CaCl_2$) solution for 30 min, washed and filtered to obtain solidified probiotics; and the solidified probiotics was stored at a low temperature of 4 °C for later use;

Step (3), powders of vitamins, minerals and prebiotics were mixed evenly, and sieved with a 70-mesh sieve to obtain vitamin-mineral-prebiotics composite powder; and the vitamin-mineral-prebiotics composite powder was then mixed (350 rpm, 30 min) evenly with the aqueous solution of the natural polymer material having a concentration of 4% according to a mass ratio of 1:11 to obtain a vitamin-mineral-prebiotics-natural polymer material mixed solution, wherein in the mixed solution, the contents of the vitamins, the minerals and the prebiotics were: 128 μg/g of vitamin A, 6 μg/g of vitamin $D_3$, 6 mg/g of vitamin E, 10 μg/g of vitamin $K_2$, 0.6 mg/g of vitamin $B_1$, 0.6 mg/g of vitamin $B_2$, 0.6 mg/g of vitamin $B_6$, 0.7 μg/g of vitamin $B_{12}$, 7 mg/g of niacinamide, 80 μg/g of folic acid, 40 mg/g of vitamin C, and 2.5 mg/g of pantothenic acid; the minerals include 133 mg/g of calcium carbonate, 51 mg/g of magnesium gluconate, 0.98 mg/g of manganese sulfate, 5 mg/g of ferrous lactate, 2.5 mg/g of zinc gluconate, 17 μg/g of sodium selenite, and 0.3 mg/g of copper sulfate; and the prebiotics content was 1.0 g/100 mL;

Step (4), the solidified probiotics was mixed (300 rpm, 30 min) evenly with the vitamin-mineral-prebiotics-natural polymer material mixed solution according to a mass ratio of 1:4 to obtain a mixed nutrient solution, and the mixed nutrient solution was then mixed evenly with an aqueous solution of an enteric coating material having a concentration of 8% according to a mass ratio of 1:5, washed twice and filtered to obtain wet probiotics-prebiotics-vitamin-mineral microspheres;

Step (5), the wet probiotics-prebiotics-vitamin-mineral microspheres were mixed (45 rpm, 15 min) evenly with the wet hydrogel particles according to a mass ratio of 1:13 to obtain a mixture; the mixture was then pre-cooled at −80 °C for 2.5 h, and then freeze-dried at −55 °C for 36 h under a vacuum degree of 25 Pa to obtain a freeze-dried product; the freeze-dried product was then crushed and sieved to obtain a capsule content; and Step (6), an empty capsule shell was fixed and punched with two holes, each having an aperture of 0.5 mm, in equidistant symmetrical positions in the middle of the waist with laser to obtain a porous capsule shell; and the porous capsule shell was then combined with the capsule content to obtain the diet-reducing capsule containing multi-nutrient microspheres.

Example 8

Step (1), sodium carboxymethyl cellulose (a viscosity of 15000) was added to an aqueous solution containing citric acid (a mass ratio of sodium carboxymethyl cellulose to citric acid was 330:1, and a mass ratio of sodium carboxymethyl cellulose to distilled water was 1:16) to obtain a mixture; the mixture was first stirred at 50 rpm for 80 min, and then stirred at 30 rpm for 16 h to obtain a gel; the gel was dried in a drying oven at 45 °C for 28 h, turned over and continued to dry for 36 h, then cross-linked at high temperature of 120 °C for 4 h, crushed and sieved to obtain solid hydrogel particles; the solid hydrogel particles were washed with distilled water for 4 times, 3 h each time (a mass ratio of the solid hydrogel particles to the distilled water was 1:200 in each washing), and filtered to obtain wet hydrogel particles;

Step (2), probiotics was inoculated in a sterile MRS liquid medium according to an inoculation amount of 3%, and repeatedly activated for 5 generations under the same culture conditions (38 °C, 21 h); bacterial sludge was collected by low-temperature centrifugation (4 °C, 3500 rpm, 20 min), and washed with 0.9% sterile normal saline for 3 times; the washed bacterial sludge was then mixed evenly with an aqueous solution of a freeze-drying protective agent to obtain a bacterial suspension; the bacterial suspension was then mixed evenly with an aqueous solution of a natural polymer material having a concentration of 1% according to a volume ratio of 1:1.5 to obtain a mixed solution; the obtained mixed solution was then solidified with a 0.1 mol/L $CaCl_2$) solution for 30 min, washed and filtered to obtain solidified probiotics; and the solidified probiotics was stored at a lower temperature of 4 °C for later use;

Step (3), powders of vitamins, minerals and prebiotics were mixed evenly, and sieved with a 70-mesh sieve to obtain vitamin-mineral-prebiotics composite powder; and the vitamin-mineral-prebiotics composite powder was then mixed (150 rpm, 30 min) evenly with the aqueous solution of the natural polymer material having a concentration of 2% according to a mass ratio of 2:11 to obtain a vitamin-mineral-prebiotics-natural polymer material mixed solution, wherein in the mixed solution, the contents of the vitamins, the minerals and the prebiotics were: 95 μg/g of vitamin A, 1 μg/g of vitamin $D_3$, 1 mg/g of vitamin E, 6 μg/g of vitamin $K_2$, 0.1 mg/g of vitamin $B_1$, 0.1 mg/g of vitamin $B_2$, 0.1 mg/g of vitamin $B_6$, 0.1 μg/g of vitamin $B_{12}$, 1 mg/g of niacinamide, 40 μg/g of folic acid, 10 mg/g of vitamin C, and 0.5 mg/g of pantothenic acid; 93 mg/g of calcium carbonate, 27 mg/g of magnesium gluconate, 0.58 mg/g of manganese sulfate, 1 mg/g of ferrous lactate, 0.1 mg/g of zinc gluconate, 10 μg/g of sodium selenite, and 0.01 mg/g of copper sulfate; and the prebiotics content was 0.3 g/100 mL;

Step (4), the solidified probiotics was mixed (100 rpm, 30 min) evenly with the vitamin-mineral-prebiotics-natural polymer material mixed solution according to a mass ratio of 1:3 to obtain a mixed nutrient solution, and the mixed nutrient solution was then mixed with an aqueous solution of an enteric coating material having a concentration of 8% according to a mass ratio of 1:6, washed for 3 times and filtered to obtain wet probiotics-prebiotics-vitamin-mineral microspheres;

Step (5), the wet probiotics-prebiotics-vitamin-mineral microspheres were mixed (45 rpm, 10 min) evenly with the wet hydrogel particles according to a mass ratio of 1:13 to obtain a mixture; the mixture was then precooled at −80 °C for 1 h, and then freeze-dried at −55 °C for 48 h under a vacuum degree of 25 Pa to obtain a freeze-dried product; the freeze-dried product was then crushed and sieved to obtain a capsule content; and Step (6), an empty capsule shell was fixed and punched with two holes, each having an aperture of 0.75 mm, in symmetrical positions in the middle of the waist with laser to obtain a porous capsule shell; and the porous capsule shell was then combined with the capsule content to obtain the diet-reducing capsule containing multi-nutrient microspheres.

Example 9

Step (1), sodium carboxymethyl cellulose (a viscosity of 7000) was added to an aqueous solution containing citric acid (a mass ratio of sodium carboxymethyl cellulose to citric acid was 350:1, and a mass ratio of sodium carboxymethyl cellulose to distilled water was 1:22) to obtain a mixture; the mixture was first stirred at 60 rpm for 90 min, and then stirred at 30 rpm for 16 h to obtain a gel; the gel was dried in a drying oven at 45 °C for 28 h, turned over and continued to dry for 36 h, then cross-linked at high temperature of 110° °C for 4 h, crushed and sieved to obtain solid hydrogel particles; the solid hydrogel particles were washed with distilled water for 4 times, 2 h each time (a mass ratio of the solid hydrogel particles to the distilled water was 1:200 in each washing), and filtered to obtain wet hydrogel particles;

Step (2), probiotics was inoculated in a sterile MRS liquid medium according to an inoculation amount of 1.5%, and repeatedly activated for 5 generations under the same culture conditions (37 °C, 21 h); bacterial sludge was collected by low-temperature centrifugation (5 °C, 5500 rpm, 15 min), and washed with 0.85% sterile normal saline for 3 times; the washed bacterial sludge was then mixed evenly with an aqueous solution of a freeze-drying protective agent having a concentration of 13% according to a volume ratio of 1:5 to obtain a bacterial suspension; the bacterial suspension was then mixed evenly with an aqueous solution of a natural polymer material having a concentration of 1.5% according to a volume ratio of 1:0.5 to obtain a mixed solution; the obtained mixed solution was then solidified with a 0.1 mol/L $CaCl_2$) solution for 30 min, washed and filtered to obtain solidified probiotics; and the solidified probiotics was stored at a low temperature of 3 °C for later use;

Step (3), powders of vitamins, minerals and prebiotics were mixed evenly, and sieved with a 70-mesh sieve to obtain vitamin-mineral-prebiotics composite powder; and the vitamin-mineral-prebiotics composite powder was then mixed (350 rpm, 10 min) evenly with the aqueous solution of the natural polymer material having a concentration of 4% according to a mass ratio of 1.5:11 to obtain a vitamin-mineral-prebiotics-natural polymer material mixed solution, wherein in the mixed solution, the contents of the vitamins, the minerals and the prebiotics were: 95 μg/g of vitamin A, 1 μg/g of vitamin $D_3$, 1 mg/g of vitamin E, 6 μg/g of vitamin $K_2$, 0.1 mg/g of vitamin $B_1$, 0.1 mg/g of vitamin $B_2$, 0.1 mg/g of vitamin $B_6$, 0.1 μg/g of vitamin $B_{12}$, 1 mg/g of niacinamide, 40 μg/g of folic acid, 10 mg/g of vitamin C, and 0.5 mg/g of pantothenic acid; the minerals include 93 mg/g of calcium carbonate, 27 mg/g of magnesium gluconate, 0.58 mg/g of manganese sulfate, 1 mg/g of ferrous lactate, 0.1 mg/g of zinc gluconate, 10 μg/g of sodium selenite, and 0.01 mg/g of copper sulfate; and the prebiotics content was 0.3 g/100 mL;

Step (4), the solidified probiotics was mixed (300 rpm, 10 min) evenly with the vitamin-mineral-prebiotics-natural polymer material mixed solution according to a mass ratio of 1:4 to obtain a mixed nutrient solution, and the mixed nutrient solution was then mixed with an aqueous solution of an enteric coating material having a concentration of 8% according to a mass ratio of 1:6, washed for 3 times and filtered to obtain wet probiotics-prebiotics-vitamin-mineral microspheres;

Step (5), the wet probiotics-prebiotics-vitamin-mineral microspheres were mixed (60 rpm, 10 min) evenly with the wet hydrogel particles according to a mass ratio of 1:17 to obtain a mixture; the mixture was then precooled at −80° °C for 2.5 h, and then freeze-dried at −55 °C for 48 h under a vacuum degree of 25 Pa to obtain a freeze-dried product; the freeze-dried product was then crushed and sieved to obtain a capsule content; and Step (6), an empty capsule shell was fixed and punched with two holes, each having an aperture of 1 mm, in symmetrical positions in the middle of the waist with laser to obtain a porous capsule shell; and the porous capsule shell was then combined with the capsule content to obtain the diet-reducing capsule containing multi-nutrient microspheres.

Comparative Example 1

Step (1), sodium carboxymethyl cellulose (a viscosity of 11000) was added to an aqueous solution containing citric acid (a mass ratio of sodium carboxymethyl cellulose to citric acid was 330:1, and a mass ratio of sodium carboxymethyl cellulose to distilled water was 1:16) to obtain a mixture; the mixture was first stirred at 60 rpm for 90 min, and then stirred at 30 rpm for 16 h to obtain a gel; the gel was dried in a drying oven at 45 °C for 24 h, turned over and continued to dry for 32 h, then cross-linked at high temperature of 120 °C for 4 h, crushed and sieved to obtain solid hydrogel particles; the solid hydrogel particles were washed with distilled water for 4 times, 3 h each time (a mass ratio of the solid hydrogel particles to the distilled water was 1:150 in each washing), and filtered to obtain wet hydrogel particles;

Step (2), probiotics was inoculated in a sterile MRS liquid medium according to an inoculation amount of 3%, and repeatedly activated for 5 generations under the same culture conditions (37 °C, 24 h); bacterial sludge was collected by low-temperature centrifugation (4 °C, 4500 rpm, 15 min), and washed twice with 0.9% sterile normal saline; the washed bacterial sludge was then mixed evenly with an aqueous solution of a freeze-drying protective agent having a concentration of 13% according to a volume ratio of 1:4 to obtain a bacterial suspension; the bacterial suspension was then solidified with a 0.1 mol/L $CaCl_2$) solution for 30 min, washed and filtered to obtain solidified probiotics; and the solidified probiotics was stored at a low temperature of 4° °C for later use;

Step (3), powders of vitamins, minerals and prebiotics were mixed evenly, and sieved with a 70-mesh sieve to obtain vitamin-mineral-prebiotics composite powder; and the vitamin-mineral-prebiotics composite powder was then mixed (150 rpm, 20 min) evenly with the aqueous solution of the natural polymer material having a concentration of 3% according to a mass of 1.5:11 to obtain a vitamin-mineral-prebiotics-natural polymer material mixed solution, wherein in the mixed solution, the contents of the vitamins, the minerals and the prebiotics were: 111 μg/g of vitamin A, 4 μg/g of vitamin $D_3$, 4 mg/g of vitamin E, 8 μg/g of vitamin $K_2$, 0.4 mg/g of vitamin $B_1$, 0.4 mg/g of vitamin $B_2$, 0.4 mg/g of vitamin $B_6$, 0.4 μg/g of vitamin $B_{12}$, 4 mg/g of niacinamide, 60 μg/g of folic acid, 25 mg/g of vitamin C, and 1.5 mg/g of pantothenic acid; the minerals include 113 mg/g of calcium carbonate, 39 mg/g of magnesium gluconate, 0.78 mg/g of manganese sulfate, 3 mg/g of ferrous lactate, 1.5 mg/g of zinc gluconate, 14 μg/g of sodium selenite, and 0.16 mg/g of copper sulfate; and the prebiotics content was 0.65 g/100 mL;

Step (4), the solidified probiotics was mixed (200 rpm, 20 min) evenly with the vitamin-mineral-prebiotics-natural polymer material mixed solution according to a mass ratio of 1:3 to obtain a mixed nutrient solution;

Step (5), the mixed nutrient solution was mixed (45 rpm, 15 min) evenly with the wet hydrogel particles according to a mass ratio of 1:15 to obtain a mixture; the mixture was then pre-cooled at −80° °C for 2.5 h, and then freeze-dried at −55 °C for 36 h under a vacuum degree of 25 Pa to obtain a freeze-dried product; the freeze-dried product was then crushed and sieved to obtain a capsule content; and Step (6), an empty capsule shell was fixed and punched with four holes, each having an aperture of 1 mm, in the middle of the waist with laser to obtain a porous capsule shell; and the porous capsule shell was then combined with the capsule content to obtain the diet-reducing capsule containing multi-nutrient microspheres.

Comparative Example 2

Step (1), sodium carboxymethyl cellulose (a viscosity of 11000) was added to an aqueous solution containing citric acid (a mass ratio of sodium carboxymethyl cellulose to citric acid was 330:1, and a mass ratio of sodium carboxymethyl cellulose to distilled water was 1:16) to obtain a mixture; the mixture was stirred at 60 rpm for 90 min, and then stirred at 30 rpm for 16 h to obtain a gel; the gel was dried in a drying oven at 45 °C for 24 h, turned over and continued to dry for 32 h, then cross-linked at high temperature of 120 °C for 4 h, crushed and sieved to obtain solid hydrogel particles; the solid hydrogel particles were washed with distilled water for 4 times, 3 h each time (a mass ratio of the solid hydrogel particles to the distilled water was 1:150 in each washing), and filtered to obtain wet hydrogel particles;

Step (2), probiotics was inoculated in a sterile MRS liquid medium according to an inoculation amount of 3%, and repeatedly activated for 5 generations under the same culture conditions (37 °C, 24 h); bacterial sludge was collected by low-temperature centrifugation (4 °C, 4500 rpm, 15 min), and washed twice with 0.9% sterile normal saline; the washed bacterial sludge was then mixed evenly with an aqueous solution of a freeze-drying protective agent having a concentration of 13% according to a volume ratio of 1:4 to obtain a bacterial suspension; the bacterial suspension was then solidified with a 0.1 mol/L $CaCl_2$) solution for 30 min, washed and filtered to obtain solidified probiotics; and the solidified probiotics was stored at a low temperature of 4 °C for later use;

Step (3), powders of vitamins, minerals and prebiotics were mixed evenly, and sieved with a 70-mesh sieve to obtain vitamin-mineral-prebiotics composite powder (the vitamins include vitamin A, vitamin $D_3$, vitamin E, vitamin $K_2$, vitamin $B_1$, vitamin $B_2$, vitamin $B_6$, vitamin $B_{12}$, niacinamide, folic acid, vitamin C, and pantothenic acid; the minerals include calcium carbonate, magnesium gluconate, manganese sulfate, ferrous lactate, zinc gluconate, sodium selenite, and copper sulfate; and the contents of vitamins, minerals and prebiotics in the finished diet-reducing capsule containing multi-nutrient microspheres were the same as those in Example 1);

Step (4), the vitamin-mineral-prebiotics composite powder, the bacterial suspension and the wet hydrogel particles were mixed (45 rpm, 15 min) evenly according to a mass ratio of 0.5:0.5:15 to obtain a mixture; the mixture was then pre-cooled at −80 °C for 2.5 h, and then freeze-dried at −55 °C for 36 h under a vacuum degree of 25 Pa to obtain a freeze-dried product; the freeze-dried product was then crushed and sieved to obtain a capsule content; and Step (5), an empty capsule shell was fixed and punched with two holes, each having an aperture of 1 mm, in the middle of the waist with laser to obtain a porous capsule shell; and the porous capsule shell was then combined with the capsule content to obtain the diet-reducing capsule containing multi-nutrient microspheres.

Comparative Example 3

Step (1), sodium carboxymethyl cellulose (a viscosity of 3000) was added to an aqueous solution containing citric acid (a mass ratio of sodium carboxymethyl cellulose to citric acid was 380:1, and a mass ratio of sodium carboxymethyl cellulose to distilled water was 1:32) to obtain a mixture; the mixture was first stirred at 100 rpm for 150 min, and then stirred at 60 rpm for 30 h to obtain a gel; the gel was dried in a drying oven at 75 °C for 30 h, turned over and continued to dry for 40 h, then cross-linked at high temperature of 130 °C for 6 h, crushed and sieved to obtain solid hydrogel particles; the solid hydrogel particles were washed with distilled water for 8 times, 4 h each time (a mass ratio of the solid hydrogel particles to the distilled water was 1:150 in each washing), and filtered to obtain wet hydrogel particles;

Step (2), probiotics was inoculated in a sterile MRS liquid medium according to an inoculation amount of 7%, and repeatedly activated for 5 generations under the same culture conditions (39 °C, 29 h); bacterial sludge was collected by low-temperature centrifugation (6° °C, 6600 rpm, 30 min), and washed with 0.95% sterile normal saline for 4 times; the washed bacterial sludge was then mixed evenly with an aqueous solution of a freeze-drying protective agent having a concentration of 25% according to a volume ratio of 1:2 to obtain a bacterial suspension; the bacterial suspension was then solidified with a 0.1 mol/L $CaCl_2$) solution for 50 min, washed and filtered to obtain solidified probiotics; and the solidified probiotics was stored at a low temperature of 6° °C for later use;

Step (3), powders of vitamins, minerals and prebiotics were mixed evenly, and sieved with a 70-mesh sieve to obtain vitamin-mineral-prebiotics composite powder; and the vitamin-mineral-prebiotics composite powder was then mixed (200 rpm, 30 min) evenly with the aqueous solution of the natural polymer material having a concentration of 6% according to a mass ratio of 3:11 to obtain a vitamin-mineral-prebiotics-natural polymer material mixed solution, wherein in the mixed solution, the contents of the vitamins, the minerals and the prebiotics were: 111 μg/g of vitamin A, 4 μg/g of vitamin $D_3$, 4 mg/g of vitamin E, 8 μg/g of vitamin $K_2$, 0.4 mg/g of vitamin $B_1$, 0.4 mg/g of vitamin $B_2$, 0.4 mg/g of vitamin $B_6$, 0.4 μg/g of vitamin $B_{12}$, 4 mg/g of niacinamide, 60 μg/g of folic acid, 25 mg/g of vitamin C, and 1.5 mg/g of pantothenic acid; the minerals include 113 mg/g of calcium carbonate, 39 mg/g of magnesium gluconate, 0.78 mg/g of manganese sulfate, 3 mg/g of ferrous lactate, 1.5 mg/g of zinc gluconate, 14 μg/g of sodium selenite, and 0.16 mg/g of copper sulfate; and the prebiotics content was 0.65 g/100 mL;

Step (4), the solidified probiotics was mixed (400 rpm, 40 min) evenly with the vitamin-mineral-prebiotics-natural polymer material mixed solution according to a mass ratio of 1:6 to obtain a mixed nutrient solution, and the mixed nutrient solution was then mixed with an aqueous solution of an enteric coating material having a concentration of 2% according to a mass ratio of 1:8, washed for 5 times and filtered to obtain wet probiotics-prebiotics-vitamin-mineral microspheres;

Step (5), the wet probiotics-prebiotics-vitamin-mineral microspheres were mixed (60 rpm, 40 min) evenly with the wet hydrogel particles according to a mass ratio of 1:20 to obtain a mixture; the mixture was then pre-cooled at −80 °C for 5 h, and then freeze-dried at −55 °C for 60 h under a vacuum degree of 25 Pa to obtain a freeze-dried product; the freeze-dried product was then crushed and sieved to obtain a capsule content; and Step (6), an empty capsule shell was fixed and punched with four holes, each having an aperture of 1 mm, in the middle of the waist with laser to obtain a porous capsule shell; and the porous capsule shell was then combined with the capsule content to obtain the diet-reducing capsule containing multi-nutrient microspheres.

The Performances of the Diet-Reducing Capsule Containing Multi-Nutrient Microspheres of the Present Disclosure were Measured.

(I) Research on Acid-Resistance Stability Testing of Probiotics in Microspheres

The samples were placed in simulated gastric juice for 2 h respectively, and then the microspheres were separated, washed and then stored at 4 °C for later use. 1 g of microspheres were added to 9 mL of phosphate buffer solution, then placed in a 37 °C shaker and shaken at 230 rpm for 30 min, followed by sampling, and the total number of viable bacteria was calculated.

The total number of viable bacteria in probiotics was determined by plate counting, and the specific operation was as follows: activated strains were mixed evenly in an aseptic operation cabinet to obtain a mixture; under the conditions of aseptic operation, the mixture was sequentially diluted into different gradients with sterile water in 10-fold increments; and the diluted products of three suitable dilution gradients were taken respectively, evenly inoculated in an MRS agar solid medium respectively, and invertedly cultured in a constant-temperature incubator at 37 °C for 24 h. Flat plates with the number of colonies between 30 to 300 were counted, and the total number of colonies was calculated according to a formula: total number of colonies (CFU/g)=average number of colonies of the same dilution gradient×dilution factor×5. The test results were shown in Table 1.

(II) Research on Determination of Embedding Rate

The samples were placed in simulated gastric juice for 2 h, and then microspheres were separated, washed and then stored at 4 °C for later use.

1 g of microspheres were added to 9 mL of phosphate buffer solution, shaken in a shaker at 37 °C, 230 rpm for 30 min, followed by sampling; the number of viable bacteria was calculated, and the vitamin content, mineral content and prebiotics content were determined. The embedding rate was calculated according to the following formula:

$$\text{Embedding rate/\%} = (H_2/H_0) \times 100$$

where $H_0$ is the content of viable bacteria (CFU/g), vitamins, minerals or prebiotics from initial; and $H_2$ is the content of viable bacteria (CFU/g), vitamins, minerals or prebiotics embedded in microspheres.

The test results were shown in Table 2.

(III) Research on Temporal Stability of Vitamins, Minerals, Probiotics and Prebiotics The samples were placed at normal temperature and pressure (indoor), and the contents of vitamins, minerals, probiotics and prebiotics in the samples were determined every 2 weeks, lasting for 10 weeks. The determination method of fat-soluble vitamin content refers to the "BJS 201717 Determination of 9 Fat-soluble Vitamins in Health Food". The determination method of water-soluble vitamin content refers to the "BJS 201716 Determination of 9 Water-soluble Vitamins in Health Food". The determination method of mineral content refers to the "BJS 201718 Determination of 9 Mineral Elements in Health Food". The determination method of probiotics content is the same as that in Test (I). The detection method of fructooligosaccharides (prebiotics) refers to "GB/T 23528.2-2021 Quality Requirements for oligosaccharides Part 2: Fructooligosaccharides". The test results were shown in Tables 3, 4, 5 and 6.

(IV) Research on Determination of Gel Swelling Rate (MUR).

A certain mass of samples was weighed (denoted as $M_0$) and placed in 100 mL of pre-prepared 37 °C diluted artificial gastric juice respectively (a volume ratio of the artificial gastric juice to sterile distilled water was 1:8, pH 2.10), and gently stirred for 0.5 h at a rotation speed of 45 rpm, followed by timing (no bubble was allowed). After the timing was over, excess diluted artificial gastric juice was removed with a stainless steel filter, absorbent paper was used to wipe off the moisture on the surface, and the samples were weighed and counted (denoted as $M_1$). The MUR was calculated according to a formula. The test was repeated for three samples in parallel, and an average was taken from the results. Formula: $MUR=(M_1-M_0)/M_0$. The test results were shown in FIG. 3.

(V) Research on Determination of Elastic Modulus

The elasticity of a sample was evaluated by dynamic mechanical analysis (DMA). After the swelling rate determination was over, the sample was immediately placed between parallel plates (with crosshatches and a diameter of 40 mm) of a rotational rheometer, and the elastic modulus was determined. A gap between the steel plates was set to 4 mm. The value of the elastic modulus at a frequency of 10 rad/s was used to determine the elasticity of sample particles. The test was repeated for three samples in parallel, and an average was taken from the results. The test results were shown in FIG. 3.

Figure 4:
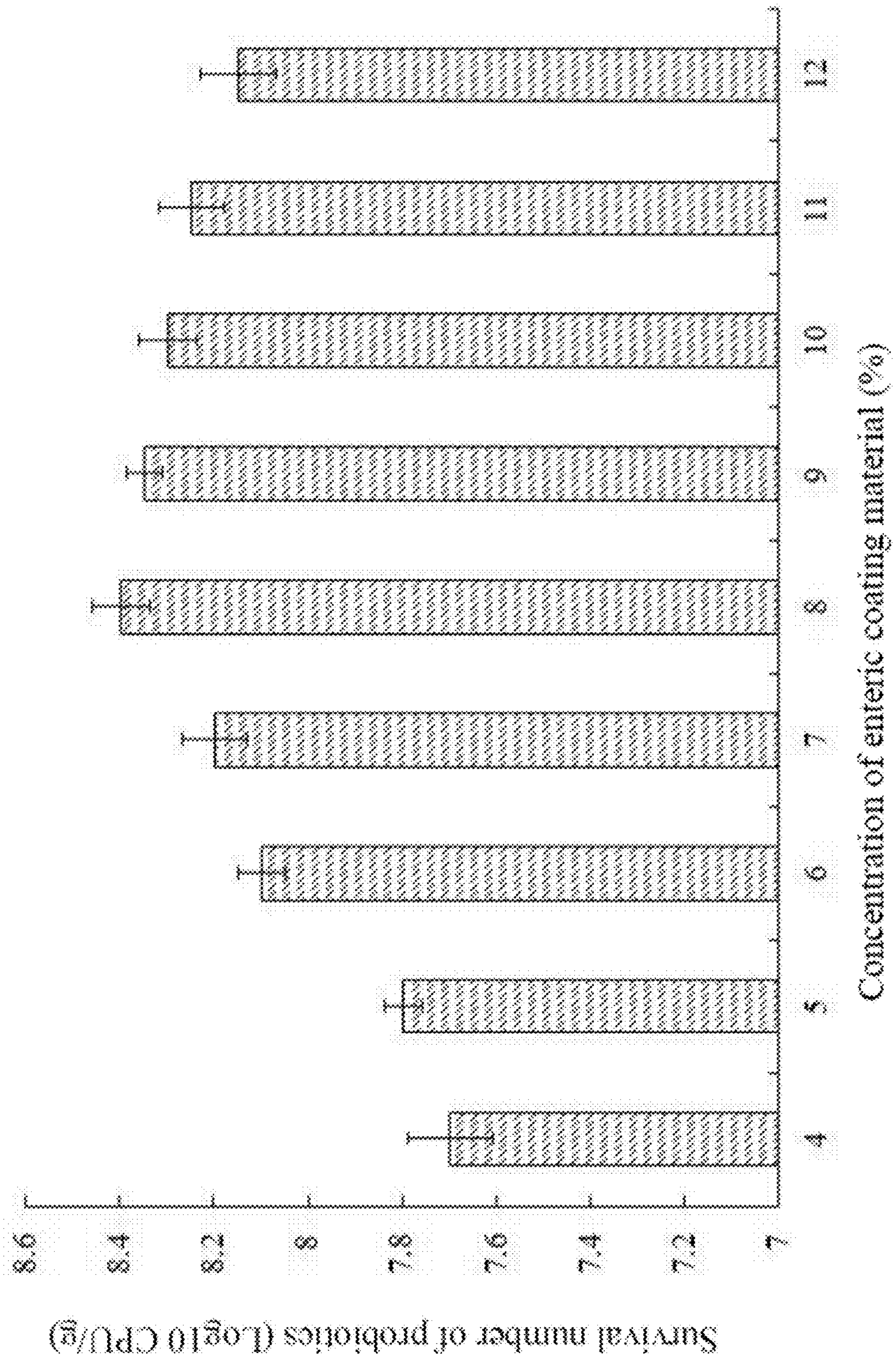
FIG. 4 is a diagram of results of effects of enteric coating materials of different concentrations on the survival number of probiotics.

(VI) Research on Effects of Different Concentrations of Enteric Coating Material on the Survival Number of Probiotics in Microspheres The samples used in this test were prepared with reference to the method of Example 1, except that the concentration of the enteric coating material was changed according to FIG. 4, and other conditions were the same as those of Example 1.

The samples (different concentrations of enteric coating material) were placed in sterile water for 2 h, and then microspheres were separated, washed and then stored at 4 °C for later use. 1 g of microspheres were added to 9 mL of phosphate buffer solution, then placed in a 37 °C shaker and shaken at 230 rpm for 30 min, followed by sampling, and the total number of viable bacteria was calculated.

The determination method for the total number of viable bacteria in probiotics was the same as that in Test (I). The test results were shown in FIG. 4.

(VII) Research on Effects of the Length of Time the Microspheres Stay in the Intestine on the Survival Number of Probiotics in the Microspheres The samples used in this test were the samples prepared in Example 1.

The samples were placed in sterile water for 2 h, and then the microspheres were separated, washed and stored at 4 °C for later use. 1 g of microspheres were added to 9 containers each containing 9 mL of artificial intestinal fluid. The containers were then placed in a 37 °C shaker and shaken at 230 rpm for different times (0 min, 15 min, 30 min, 45 min, 60 min, 75 min, 90 min, 105 min, and 120 min), followed by sampling. The total number of viable bacteria was calculated.

Figure 5:
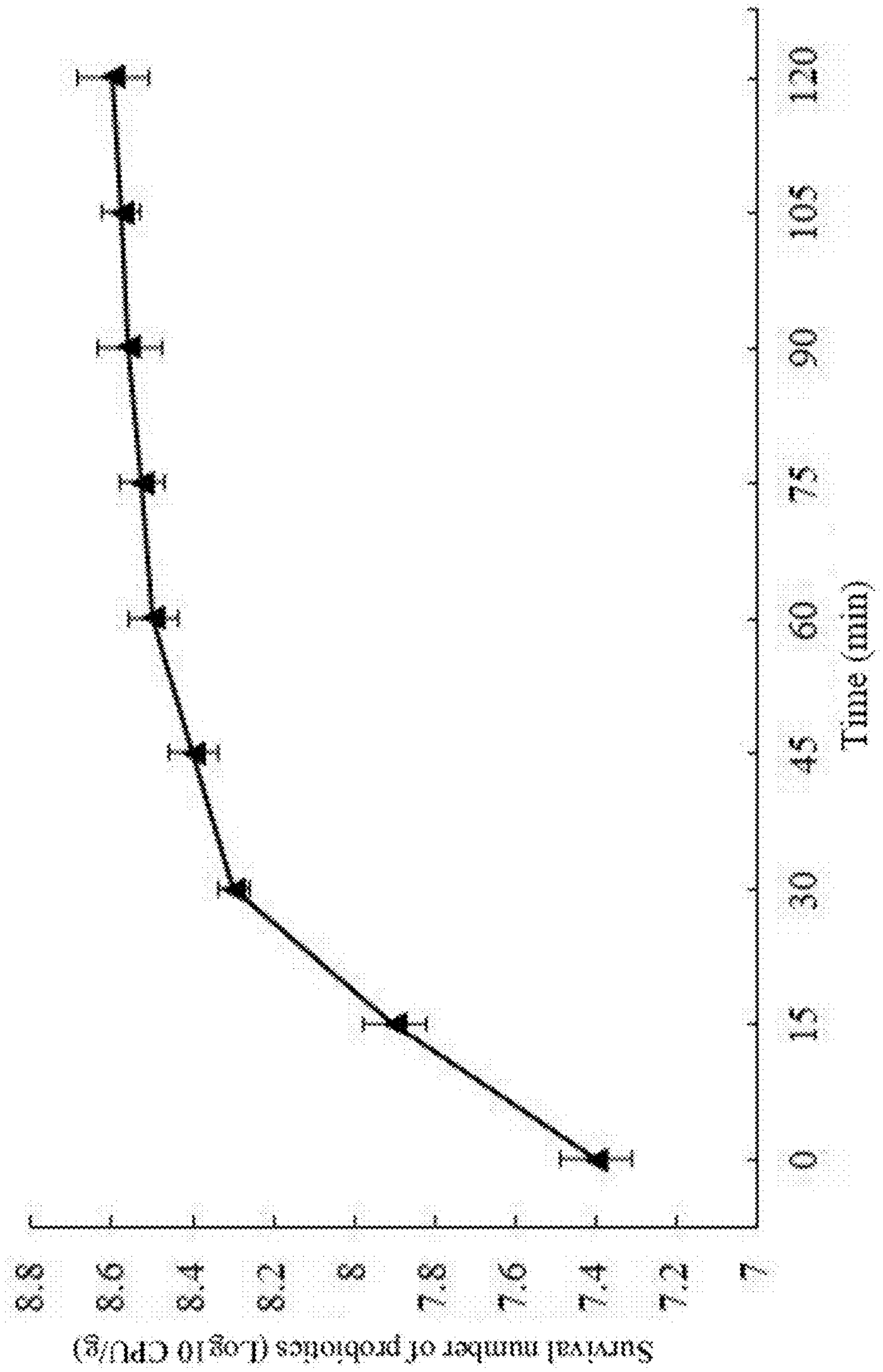
FIG. 5 is a diagram of results of effects of microspheres staying in artificial intestinal fluid for different times on the survival number of the probiotics.

The determination method for the total number of viable bacteria in probiotics was the same as that in Test (I). The test results were shown in FIG. 5.

(VIII) Research on Effects of Different Laser Punching Methods on Determination of the Disintegration Time of Capsule The samples used in this test were prepared with reference to the method of Example 1, except that the empty capsule shell was punched with different laser punching methods, and other conditions were the same as those of Example 1.

A test design for the effects of different laser punching methods on determination of the disintegration time of a capsule was shown in Table 7.

TABLE 7

| Test code | Punching positions on empty capsule shell | Number of punching (hole) | Aperture (mm) |
|---|---|---|---|
| A | Symmetrical positions in the middle of the waist | 2 | 1.00 |
| B | Symmetrical positions in the middle of the waist | 4 | 1.00 |
| C | Central symmetrical positions at both ends | 2 | 1.00 |
| D | Equidistant symmetrical positions at both ends and the waist | 4 | 1.00 |
| E | Equidistant positions of skew symmetry from the vertex and midline | 2 | 1.00 |
| F | Symmetrical positions in the middle of the waist | 2 | 0.75 |
| G | Symmetrical positions in the middle of the waist | 4 | 0.75 |
| H | Central symmetrical positions at both ends | 2 | 0.75 |
| I | Equidistant symmetrical positions at both ends and the waist | 4 | 0.75 |

TABLE 7-continued

| Test code | Punching positions on empty capsule shell | Number of punching (hole) | Aperture (mm) |
|---|---|---|---|
| J | Equidistant positions of skew symmetry from the vertex and midline | 2 | 0.75 |
| K | Symmetrical positions in the middle of the waist | 2 | 0.50 |
| L | Symmetrical positions in the middle of the waist | 4 | 0.50 |
| M | Central symmetrical positions at both ends | 2 | 0.50 |
| N | Equidistant symmetrical positions at both ends and the waist | 4 | 0.50 |
| O | Equidistant positions of skew symmetry from the vertex and midline | 2 | 0.50 |

Figure 6:
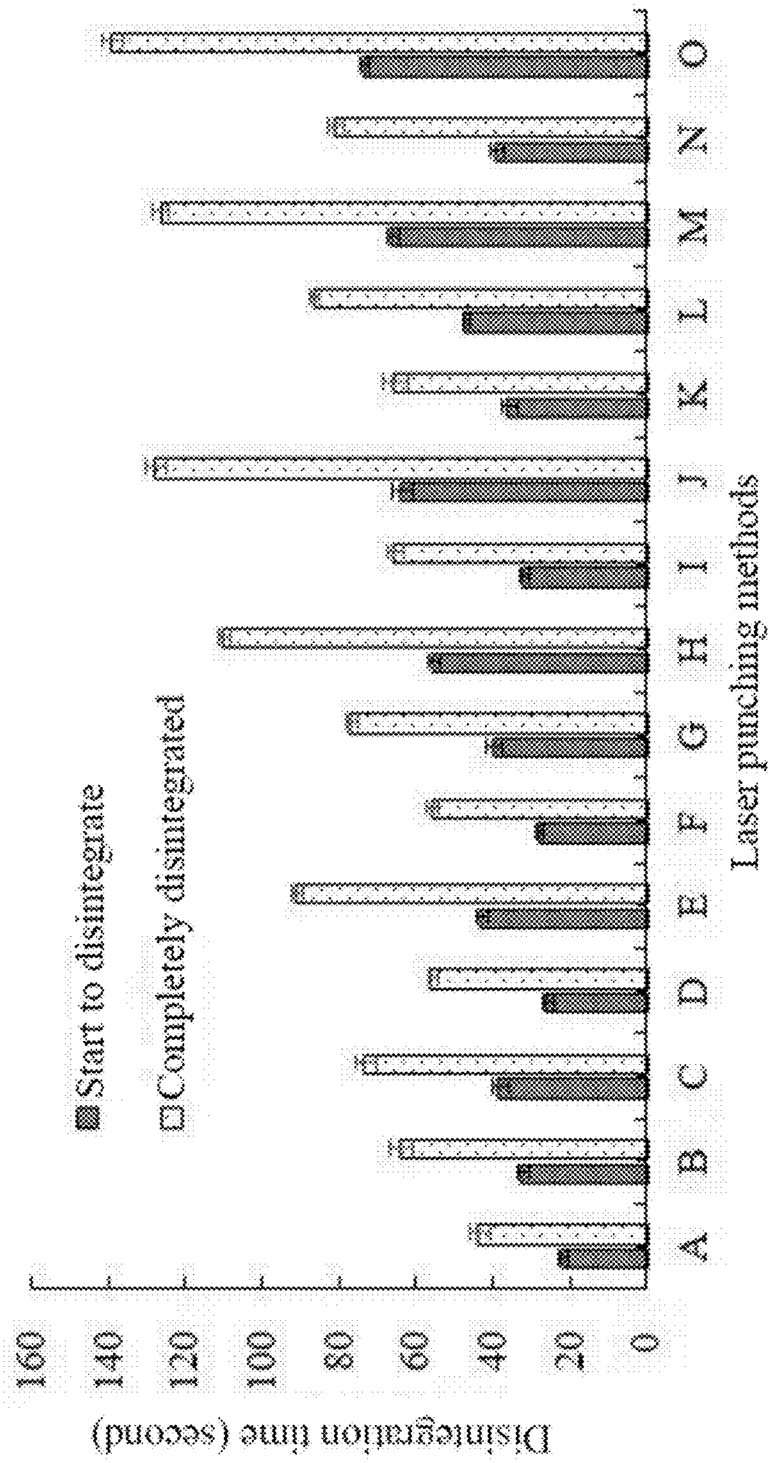
FIG. 6 is a diagram of test results of capsule disintegration time.

Capsule disintegration time determination method: the test was carried out in accordance with the "Pharmacopoeia of the People's Republic of China", Edition 2020, Part IV, General Principles 0921, "Disintegration Time Limit Inspection Method". Six test sample capsules were taken, a disintegration time limit tester was checked and equipped with a baffle, the temperature was set to 37° °C, and the time when the capsules were completely dissolved in the artificial gastric juice was recorded. The capsules should be completely disintegrated within 30 min. If there was one capsule that cannot be completely disintegrated, another six capsules should be taken for retesting. If there was another one capsule that cannot be completely disintegrate, it would be recorded as unqualified. The test was repeated for three samples in parallel, and an average was taken from the results. The test results were shown in FIG. 6.

(IX) Study of Weight Loss Effect of Capsule Prepared by the Present Disclosure

Figure 7:
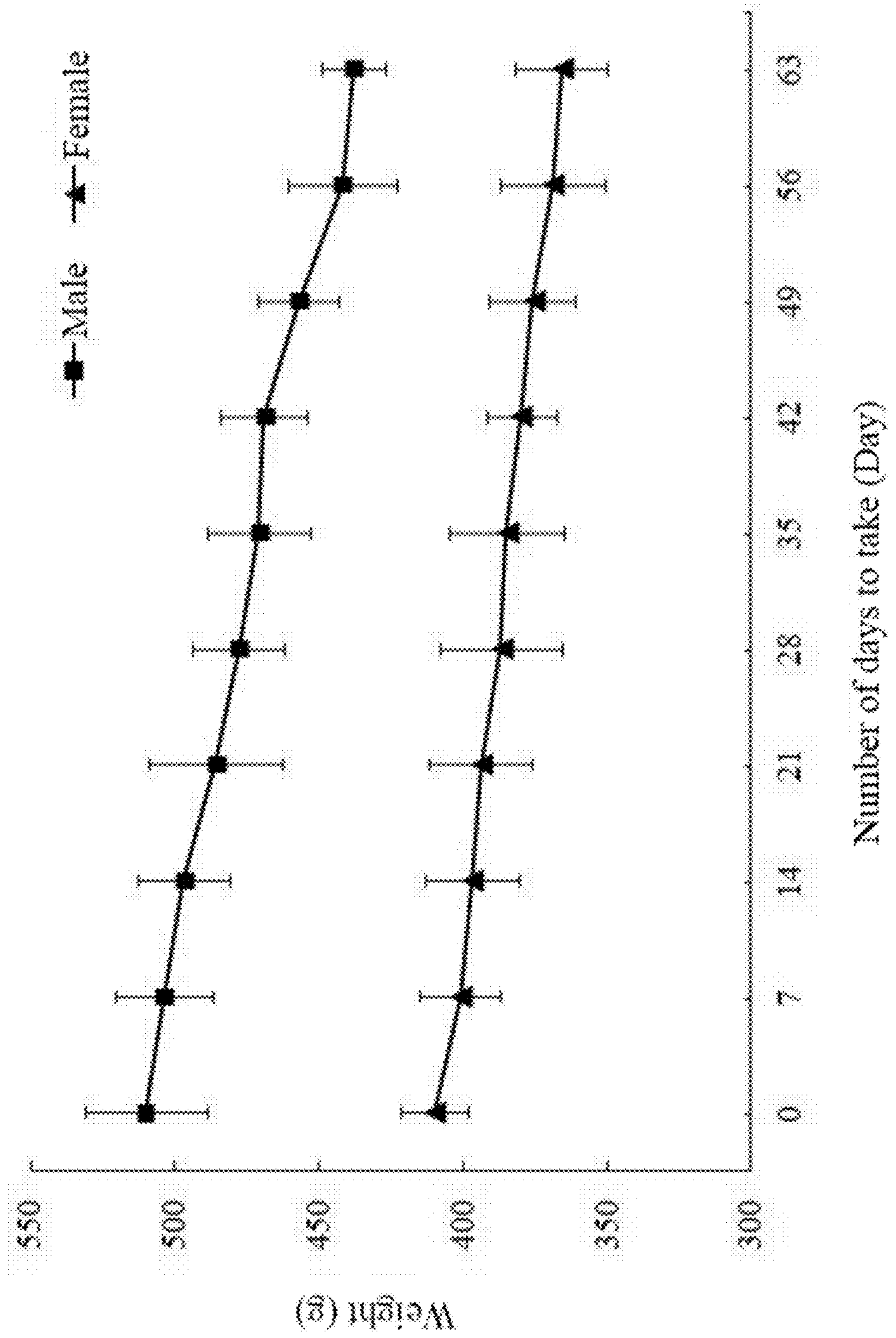
FIG. 7 is a diagram of changes in weights of adult obese rats after the capsule of the present disclosure is taken.

Example 1 was selected as a test sample. Five male and female obese rats of the same age and sexual maturity were taken respectively, with a male rat weight of 500 to 520 g and a female rat weight of 400 to 420 g. The obese rats were given one capsule 30 min before meals every day at regular time, the obese rats were given normal diet after 30 min, and the test continued in this way for 63 days; and the weights of the obese rats were weighed and recorded at regular time of 20:00 every 7 days. The test results were shown in FIG. 7.

Performance Test Results of Examples 1 to 9 and Comparative Examples 1 to 3 as Samples were Described as Follows

TABLE 1

Research results of acid resistance of probiotics in microspheres

| Samples | Acid resistance of probiotics (CPU/g) |
|---|---|
| Example 1 | $2.22 \times 10^8$ |
| Example 2 | $1.59 \times 10^8$ |
| Example 3 | $1.85 \times 10^8$ |
| Example 4 | $1.88 \times 10^8$ |
| Example 5 | $1.46 \times 10^8$ |
| Example 6 | $1.63 \times 10^8$ |
| Example 7 | $1.73 \times 10^8$ |
| Example 8 | $1.64 \times 10^8$ |
| Example 9 | $1.53 \times 10^8$ |
| Comparative example 1 | $4.2 \times 10^5$ |
| Comparative example 2 | $5.6 \times 10^4$ |
| Comparative example 3 | $1.3 \times 10^7$ |

TABLE 2

Embedding rates of probiotics, vitamins, minerals and prebiotics in microspheres

| Sample | Probiotics (%) | Vitamins (%) | Minerals (%) | Prebiotics (%) |
|---|---|---|---|---|
| Example 1 | 87.8 | 86.98 | 81.12 | 86.15 |
| Example 2 | 84.65 | 81.16 | 75.32 | 77 |
| Example 3 | 86.61 | 84.92 | 73.33 | 76.67 |
| Example 4 | 85.83 | 80.15 | 79.78 | 78.46 |
| Example 5 | 83.86 | 82.74 | 78.04 | 81.54 |
| Example 6 | 83.86 | 82.79 | 78.46 | 75 |
| Example 7 | 85.04 | 81.69 | 75.12 | 77 |
| Example 8 | 84.65 | 80.13 | 80.79 | 83.33 |
| Example 9 | 83.07 | 80.44 | 77.21 | 73.33 |
| Comparative example 1 | 83.86 | 78.45 | 70.66 | 76.92 |
| Comparative example 2 | 30.71 | 60.11 | 41.75 | 36.92 |
| Comparative example 3 | 85.43 | 81.4 | 60.86 | 69.23 |

TABLE 3

Storage stability of probiotics in microspheres
Storage stability of probiotics ($\times 10^8$ CPU/g)

| Sample | Week 0 | Week 2 | Week 4 | Week 6 | Week 8 | Week 10 |
|---|---|---|---|---|---|---|
| Example 1 | 2.23 | 2.31 | 2.26 | 2.21 | 2.18 | 2.14 |
| Example 2 | 2.15 | 2.09 | 2.05 | 2.01 | 1.97 | 1.94 |
| Example 3 | 2.19 | 2.16 | 2.11 | 2.07 | 2.05 | 2.01 |
| Example 4 | 2.18 | 2.15 | 2.11 | 2.07 | 2.03 | 1.98 |
| Example 5 | 2.13 | 2.08 | 2.03 | 1.99 | 1.95 | 1.91 |
| Example 6 | 2.13 | 2.09 | 2.05 | 2.01 | 1.97 | 1.92 |
| Example 7 | 2.16 | 2.11 | 2.02 | 1.96 | 1.89 | 1.86 |
| Example 8 | 2.15 | 2.09 | 2.04 | 2.01 | 1.94 | 1.87 |
| Example 9 | 2.11 | 2.06 | 1.99 | 1.93 | 1.87 | 1.79 |
| Comparative example 1 | 2.24 | 2.2 | 2.15 | 2.11 | 2.06 | 2.01 |
| Comparative example 2 | 2.17 | 2.02 | 1.86 | 1.68 | 1.56 | 1.37 |
| Comparative example 3 | 1.84 | 1.81 | 1.78 | 1.71 | 1.65 | 1.62 |

TABLE 4

Storage stability of vitamins in microspheres
Storage stability of vitamins in microspheres (%)

| Sample | Week 0 | Week 2 | Week 4 | Week 6 | Week 8 | Week 10 |
|---|---|---|---|---|---|---|
| Example 1 | 86.98 | 86.73 | 86.51 | 86.28 | 86.01 | 85.81 |
| Example 2 | 81.16 | 80.88 | 80.55 | 80.13 | 79.5 | 79.02 |
| Example 3 | 84.92 | 84.56 | 84.09 | 83.68 | 83.48 | 83.25 |
| Example 4 | 80.15 | 79.83 | 79.43 | 79.14 | 78.88 | 78.62 |
| Example 5 | 82.74 | 82.72 | 82.51 | 82.29 | 81.82 | 81.82 |

TABLE 4-continued

| Storage stability of vitamins in microspheres Storage stability of vitamins in microspheres (%) | | | | | | |
|---|---|---|---|---|---|---|
| Sample | Week 0 | Week 2 | Week 4 | Week 6 | Week 8 | Week 10 |
| Example 6 | 82.79 | 82.62 | 82.31 | 81.98 | 81.68 | 81.45 |
| Example 7 | 81.69 | 81.57 | 81.07 | 80.68 | 80.24 | 79.91 |
| Example 8 | 80.13 | 79.96 | 79.74 | 79.52 | 79.23 | 78.96 |
| Example 9 | 80.44 | 80.31 | 80.09 | 79.76 | 79.35 | 79.01 |
| Comparative example 1 | 78.45 | 77.32 | 76.62 | 75.38 | 74.52 | 73.45 |
| Comparative example 2 | 60.11 | 58.87 | 56.69 | 54.53 | 52.46 | 51.34 |
| Comparative example 3 | 81.4 | 80.97 | 80.51 | 80.15 | 79.85 | 79.28 |

TABLE 5

| Storage stability of minerals in microspheres Storage stability of minerals in microspheres (%) | | | | | | |
|---|---|---|---|---|---|---|
| Sample | Week 0 | Week 2 | Week 4 | Week 6 | Week 8 | Week 10 |
| Example 1 | 81.12 | 81.07 | 80.84 | 80.62 | 80.48 | 80.24 |
| Example 2 | 75.32 | 75.31 | 74.76 | 74.52 | 74.12 | 73.71 |
| Example 3 | 73.33 | 73.32 | 72.83 | 72.37 | 71.85 | 71.49 |
| Example 4 | 79.78 | 79.66 | 79.52 | 79.29 | 79.14 | 78.85 |
| Example 5 | 78.04 | 77.94 | 77.55 | 77.19 | 76.81 | 76.45 |
| Example 6 | 78.46 | 78.34 | 78.05 | 77.69 | 77.35 | 77.14 |
| Example 7 | 75.12 | 74.97 | 74.64 | 74.48 | 74.25 | 73.85 |
| Example 8 | 80.79 | 80.56 | 80.14 | 80.03 | 79.81 | 79.62 |
| Example 9 | 77.21 | 77.04 | 76.61 | 76.24 | 79.81 | 75.48 |
| Comparative example 1 | 70.66 | 68.54 | 67.41 | 66.26 | 65.25 | 63.89 |
| Comparative example 2 | 41.75 | 39.96 | 37.61 | 34.56 | 32.24 | 30.24 |
| Comparative example 3 | 60.86 | 59.62 | 59.18 | 58.61 | 58.23 | 57.58 |

TABLE 6

| Storage stability of prebiotics in microspheres Storage stability of prebiotics in microspheres (%) | | | | | | |
|---|---|---|---|---|---|---|
| Sample | Week 0 | Week 2 | Week 4 | Week 6 | Week 8 | Week 10 |
| Example 1 | 86.15 | 86.22 | 85.96 | 85.61 | 85.29 | 84.97 |
| Example 2 | 77.02 | 76.77 | 76.43 | 76.26 | 75.92 | 75.34 |
| Example 3 | 76.67 | 76.42 | 76.05 | 75.68 | 75.19 | 74.77 |
| Example 4 | 78.46 | 78.31 | 78.05 | 77.72 | 77.19 | 76.87 |
| Example 5 | 81.54 | 81.23 | 80.99 | 80.64 | 80.34 | 79.92 |
| Example 6 | 75.01 | 74.97 | 74.72 | 74.37 | 74.13 | 73.96 |
| Example 7 | 77.04 | 76.98 | 76.65 | 76.29 | 76.14 | 75.91 |
| Example 8 | 83.33 | 82.97 | 82.51 | 82.24 | 81.84 | 81.33 |
| Example 9 | 73.33 | 72.99 | 72.67 | 72.24 | 71.75 | 71.59 |
| Comparative example 1 | 76.92 | 75.94 | 75.51 | 75.04 | 74.25 | 73.71 |
| Comparative example 2 | 36.92 | 34.52 | 33.14 | 30.66 | 29.44 | 28.24 |
| Comparative example 3 | 69.23 | 68.84 | 68.64 | 68.25 | 67.48 | 67.06 |

Figure 3:
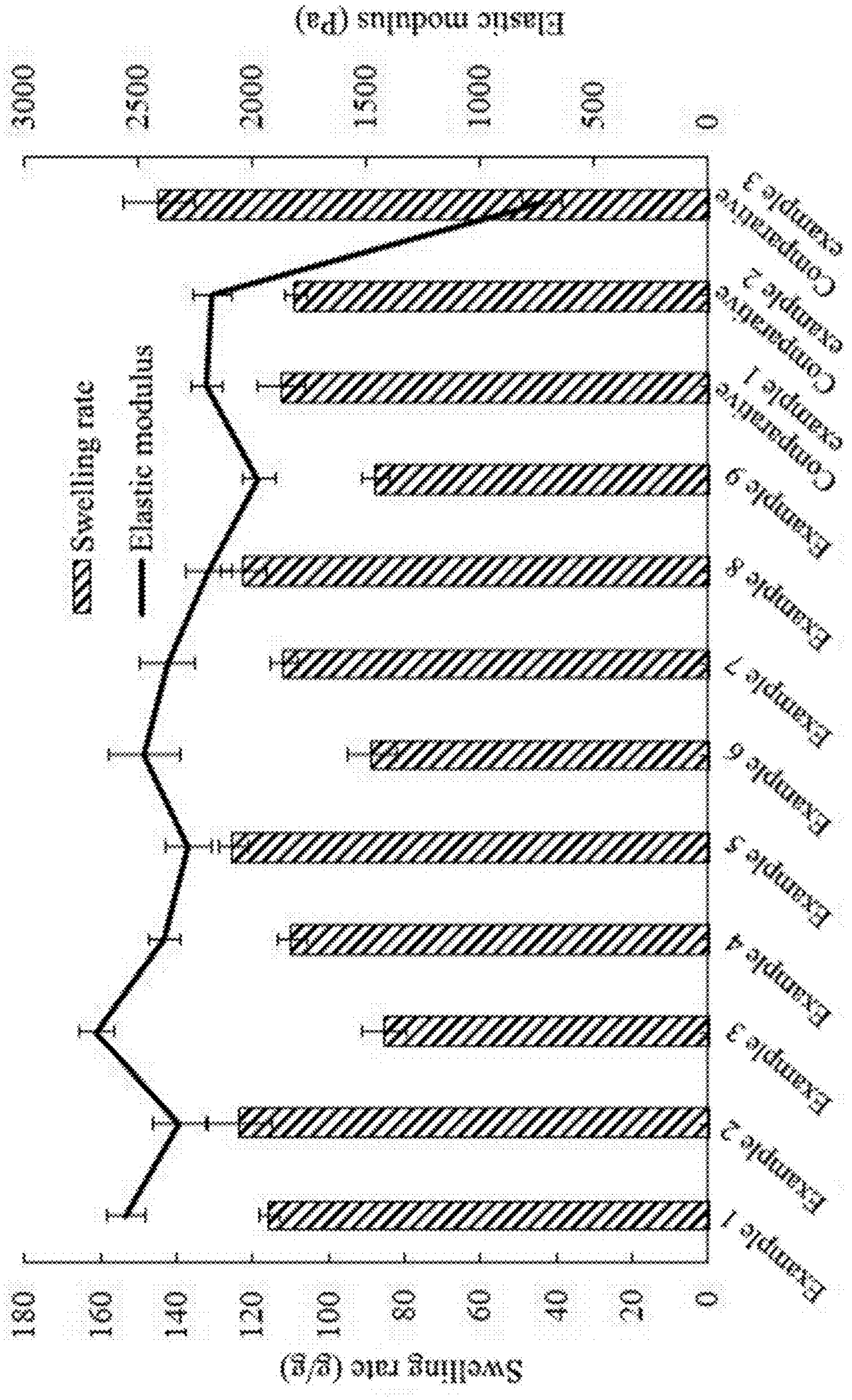
FIG. 3 is a diagram of test results of gel swelling rates and elastic modulus of samples.

As can be seen from Table 1, compared with Comparative examples 1 to 3, the number of viable bacteria in each of Examples 1 to 9 was more than $10^8$, indicating that the probiotics in the microspheres had good acid resistance. As can be seen from Table 2, in Examples 1 to 9, the embedding rates of probiotics and vitamins were more than 80% respectively, the embedding rate of minerals was more than 70%, the embedding rate of prebiotics was more than 75%, and the embedding rate of nutrients in the microspheres was good. As can be seen from Tables 3, 4, 5 and 6, the probiotics, vitamins, minerals and prebiotics had good storage stability. As can be seen from FIG. 3, compared with Comparative example 3, the swelling rate and elastic modulus were good in Examples 1 to 9. As can be seen from FIG. 4, the survival number of probiotics in the preparation process of microspheres increased first and then decreased with the increase of the concentration of the enteric coating material, and the survival number of probiotics reached a maximum value when the concentration of the enteric coating material was 8%. As can be seen from FIG. 5, the microspheres were basically completely released while staying in the artificial intestinal fluid for 30 min, and can stably exist in the artificial intestinal fluid. As can be seen from FIG. 6, different laser punching methods had a great influence on the disintegration time of the capsule, among which two holes in symmetrical positions in the middle of the waist of the capsule shell with an aperture of 1 mm are the most suitable, which greatly increases the disintegration speed. As can be seen from FIG. 7, the weights of adult male and female rats changed significantly after taking this capsule, with a weight loss of 14.11% and 10.73% respectively after 2 months.

Although the contents of the present disclosure have been described in detail by the preferred examples above, it should be recognized that the above description should not be considered as a limitation on the present disclosure. After a person skilled in the art has read the above contents, a variety of modifications and substitutions made for the present disclosure will be obvious. Therefore, the protection scope of the present disclosure should be defined by the appended claims.

What is claimed is:

1. A preparation method for a diet-reducing capsule containing multi-nutrient microspheres, comprising the following steps:

step (1), adding sodium carboxymethyl cellulose to an aqueous solution containing a polybasic carboxylic acid, stirring evenly to obtain a gel, drying the gel in a drying oven, then performing cross-linking at high temperature to obtain a cross-linked product, crushing and sieving the cross-linked product to obtain solid hydrogel particles, and washing and filtering with distilled water to prepare wet hydrogel particles;

step (2), inoculating probiotics in a sterile medium, repeatedly culturing the probiotics for 5 generations under the same culture conditions, collecting bacterial sludge by low-temperature centrifugation, washing the bacterial sludge with sterile normal saline, mixing the washed bacterial sludge evenly with an aqueous solution of a freeze-drying protective agent to obtain a bacterial suspension, then adding an aqueous solution of a natural polymer material to the bacterial suspension and mixing evenly again, then solidifying the obtained mixed solution, and washing and filtering to obtain solidified probiotics, followed by low-temperature storage for later use;

step (3), mixing powders of vitamins, minerals and prebiotics evenly, sieving through a 70-mesh sieve to obtain a vitamin-mineral-prebiotics composite powder, and then mixing the vitamin-mineral-prebiotics composite powder evenly with the aqueous solution of the natural polymer material to obtain a vitamin-mineral-prebiotics-natural polymer material mixed solution;

step (4), mixing the solidified probiotics evenly with the vitamin-mineral-prebiotics-natural polymer material mixed solution to obtain a mixed nutrient solution, then mixing the mixed nutrient solution with an aqueous solution of an enteric coating material to form microspheres, and washing and filtering the microspheres to obtain wet probiotics-prebiotics-vitamin-mineral microspheres;

step (5), mixing the wet probiotics-prebiotics-vitamin-mineral microspheres evenly with the wet hydrogel particles, pre-cooling and then freeze-drying, and then crushing and sieving to obtain a capsule content;

step (6), punching holes in an empty capsule shell with laser to obtain a porous capsule shell, and then combining the porous capsule shell with the capsule content to obtain the diet-reducing capsule containing multi-nutrient microspheres, wherein in the step (1), a viscosity of the sodium carboxymethyl cellulose is 7000 to 15000;

a mass ratio of the sodium carboxymethyl cellulose to the polybasic carboxylic acid is (310 to 350): 1, and a mass ratio of the sodium carboxymethyl cellulose to water is 1: (10 to 22); a way of stirring is performed first for 80 to 100 min at a rotation speed of 50 to 70 rpm, and then for 14 to 20 h at a rotation speed of 20 to 40 rpm; a drying temperature of the drying oven is 40 to 60 °C, with drying first for 20 to 28 h, turning over and then continuing to dry for 28 to 36 h; a temperature of cross-linking at the high-temperature is 110 to 130 °C, and a time of cross-linking at the high-temperature is 3.6 to 4.4 h; the step of crushing and sieving the cross-linked product is achieved with a crusher, and an 18-mesh sieve and a 26-mesh sieve; the step of washing the solid hydrogel particles with the distilled water is performed 2 to 6 times, 2 to 4 h each time, wherein a mass ratio of the solid hydrogel particles to the distilled water is 1: (100 to 200) in each washing;

in the step (6), a laser source of the laser is a cold light source, each punched hole has an aperture of 0.5 to 1.5 mm, and a number of the punched holes is 1 to 4; and when the porous capsule shell is combined with the capsule content, a mass of the capsule content contained in each porous capsule shell is 0.60 to 0.75 g.

2. The preparation method according to claim 1, wherein in the step (1), the polybasic carboxylic acid is one of citric acid, aconitic acid, oxalic acid, tartaric acid, malic acid, acetic acid, malonic acid, succinic acid, adipic acid, azelaic acid, terephthalic acid, trimellitic acid, trimesic acid, ethylenediaminetetraacetic acid, and 2-methylglutaric acid;

in the step (2), the probiotics is a mixed strain selected from two or more of *Lactobacillus plantarum, Lactobacillus rhamnosus, Lactobacillus fermentum, Lactobacillus salivarius, Lactobacillus helveticus, Lactobacillus gasseri, Lactobacillus johnsonii, Lactobacillus crispatus, Lactobacillus delbrueckii* subsp. *bulgaricus, Lactobacillus acidophilus, Lactobacillus casei* subsp. *Casei, Lactobacillus paracasei, Lactobacillus reuteri, Bifidobacterium lactis, Bifidobacterium bifidum, Bifidobacterium infantis, Bifidobacterium longum, Bifidobacterium breve, Bifidobacterium adolescent, Bifidobacterium animalis*, and *Streptococcus thermophilus;* in the step (3), the vitamin is at least one of vitamin A, vitamin $D_3$, vitamin E, vitamin $K_2$, vitamin $B_1$, vitamin $B_2$, vitamin $B_6$, vitamin $B_{12}$, vitamin $B_{13}$, vitamin $B_{15}$, vitamin C, biotin, niacinamide, folic acid, inositol, and pantothenic acid; the mineral is at least one of calcium, magnesium, manganese, iron, zinc, cobalt, molybdenum, chromium, copper, selenium, iodine, phosphorus, potassium, sodium, sulfur, and chlorine; the prebiotics is one of fructooligosaccharides, xylooligosaccharides, galactooligosaccharides, isomaltooligosaccharides, soybean oligosaccharides, mannose oligosaccharides, lactulose, raffinose, stachyose, chitosan oligosaccharides, resistant starch, wheat dextrin, inulin, polydextrose, trehalose, *Aspergillus niger* oligosaccharides, *spirulina*, Arthrospira, *chlorella*, and microalgae;

in the steps (2) and (3), the natural polymer material is one or more of sodium alginate, chitosan, modified starch, carboxymethyl cellulose, methyl cellulose, ethyl cellulose, hydroxypropyl cellulose, gallant gum, k-carrageenan, Arabic gum, pectin, carrageenan, gellan gum, xanthan gum, maltodextrin, β-cyclodextrin, gelatin, soy protein isolate, and whey protein;

in the step (2), the freeze-drying protective agent is one or more of soluble starch, hydroxyethyl starch, resistant dextrin, fructose, glucose, lactose, sucrose, ribose, rhamnose, galactose, fucose, mannose, arabinose, xylan, skimmed milk powder, glycerin, lactitol, sorbitol, mannitol, xylitol, erythritol, maltitol, sodium glutamate, antifreeze peptide, sericin peptide, fish collagen peptide, collagen, and polyvinylpyrrolidone; and in the step (4), the enteric coating material is one or more of shellac, algin, diclofenac, cellulose acetate benzenedicarboxylate, cellulose acetate succinate, hydroxypropyl methylcellulose acetate succinate, cellulose acetate phthalate, hydroxypropyl methylcellulose phthalate, cellulose acetate 1,2,4-benzenetricarboxylate, hydroxypropyl methylcellulose 1,2,4-benzenetricarboxylate, hydroxypropyl methylcellulose titanate, and polyvinyl acetate phthalate.

3. The preparation method according to claim 1, wherein in the step (2), an inoculation amount of the probiotics is 1.5 to 4.5%; the sterile medium is an MRS liquid medium; the low-temperature centrifugation is to carry out centrifugation at 3 to 5 °C, with a centrifugation speed of 3500 to 5500 rpm, and centrifugation time of 10 to 20 min; a number of times of washing with the sterile normal saline is 1 to 3; in the aqueous solution of the freeze-drying protective agent, a mass fraction of the freeze-drying protective agent is 6% to 20%; the bacterial sludge and the aqueous solution of the freeze-drying protective agent are mixed in a volume ratio of 1:(3 to 5), and then stirred for 10 to 20 min at a stirring speed of 200 to 400 rpm; the probiotics in the bacterial suspension has a concentration of 109 CFU/mL; the probiotics is solidified with a 0.1 mol/L $CaCl_2$) solution for 20 to 40 min; and a temperature of the low-temperature storage is 3 to 5 °C.

4. The preparation method according to claim 1, wherein in the step (3), a ratio of a total mass of the vitamins, the minerals and the prebiotics to a mass of the aqueous solution of the natural polymer material is (1 to 2): 11; the vitamin-mineral-prebiotics composite powder and the aqueous solution of the natural polymer material are mixed for 10 to 30 min at a rotation speed of 150 to 350 rpm; and in the vitamin-mineral-prebiotics-natural polymer material mixed solution, the vitamins comprise 95 to 128 μg/g of vitamin A, 1 to 6 μg/g of vitamin $D_3$, 1 to 6 mg/g of vitamin E, 6 to 10 μg/g of vitamin $K_2$, 0.1 to 0.6 mg/g of vitamin $B_1$, 0.1 to 0.6 mg/g of vitamin $B_2$, 0.1 to 0.6 mg/g of vitamin $B_6$, 0.1 to 0.7 μg/g of vitamin $B_{12}$, 1 to 7 mg/g of niacinamide, 40 to 80 μg/g of folic acid, 10 to 40 mg/g of vitamin C, and 0.5 to 2.5 mg/g of pantothenic acid; the minerals comprise 93 to 133 mg/g of calcium carbonate, 27 to 51 mg/g of magnesium gluconate, 0.58 to 0.98 mg/g of manganese sulfate, 1 to 5 mg/g of ferrous lactate, 0.1 to 2.5 mg/g of zinc gluconate, 10 to 17 μg/g of sodium selenite, and 0.01 to 0.30 mg/g of copper sulfate; and the prebiotics content is 0.3 to 1.0 g/100 mL.

5. The preparation method according to claim 1, wherein in the step (4), a mixing time of the solidified probiotics and the vitamin-mineral-prebiotics-natural polymer material mixed solution, and a mixing time of the mixed nutrient solution and the aqueous solution of the enteric coating material are 10 to 30 min, respectively, with a rotation speed of 100 to 300 rpm; a mass concentration of the aqueous solution of the enteric coating material is 4% to 12%; and the washing is performed with sterile distilled water for 2 to 4 times.

6. The preparation method according to claim 1, wherein in the step (5), a mixing time of the wet probiotics-prebiotics-vitamin-mineral microspheres and the wet hydrogel particles is 10 to 20 min, with a rotation speed of 30 to 60 rpm; a treatment of pre-cooling is performed at −80 °C for 1 to 4 h; and freeze-drying at a temperature of −55 °C and a vacuum degree of 25 Pa, for 24 to 48 h.

7. The preparation method according to claim 1, wherein in the step (6), the empty capsule shell is made of one of gelatin, pullulan and glutinous rice starch, and has a model selected from one of #000, #00, #0, #1, #2, #3, #4 and extended models thereof; and a punching position of the empty capsule shell is one of symmetrical positions in the middle of the waist, central symmetrical positions at both ends, equidistant symmetrical positions at both ends and the waist, as well as equidistant positions of skew symmetry from the vertex and midline.

* * * * *